(12) United States Patent
Matsuura et al.

(10) Patent No.: US 10,944,091 B2
(45) Date of Patent: Mar. 9, 2021

(54) POWER STORAGE DEVICE

(71) Applicant: TOYOTA JIDOSHA KABUSHIKI KAISHA, Toyota (JP)

(72) Inventors: Tomohiro Matsuura, Toyota (JP); Yukinobu Miyamura, Osaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/056,690

(22) Filed: Aug. 7, 2018

(65) Prior Publication Data

US 2019/0067669 A1 Feb. 28, 2019

(30) Foreign Application Priority Data

Aug. 22, 2017 (JP) .............................. JP2017-159417

(51) Int. Cl.
*H01M 2/26* (2006.01)
*H01G 11/00* (2013.01)
*H01M 10/04* (2006.01)

(52) U.S. Cl.
CPC ............ *H01M 2/266* (2013.01); *H01G 11/00* (2013.01); *H01M 10/0413* (2013.01); *H01M 10/0463* (2013.01)

(58) Field of Classification Search
None
See application file for complete search history.

(56) References Cited

U.S. PATENT DOCUMENTS

2009/0317717 A1   12/2009  Ryu et al.
2012/0189899 A1*   7/2012  Kanda .................. H01M 2/266
                                                      429/153

FOREIGN PATENT DOCUMENTS

| JP | 2000-100414 A | 4/2000 |
| JP | 2011-155015 A | 8/2011 |
| JP | 2013-196959 A | 9/2013 |
| JP | 2013-218958 A | 10/2013 |
| JP | 5751203 B2 | 7/2015 |
| JP | 2016-001561 A | 1/2016 |

* cited by examiner

*Primary Examiner* — Daniel S Gatewood
(74) *Attorney, Agent, or Firm* — Sughrue Mion, PLLC

(57) ABSTRACT

There is provided a power storage device including: a power storage assembly; and a plurality of joined portions, each of the plurality of electrode plates including an electrode plate main body and a tab, the plurality of electrode plates being disposed such that the tabs are arranged in the stacking direction, the plurality of joined portions including a first joined portion configured to join the plurality of tabs to form a first bundle portion, and a second joined portion configured to join the plurality of tabs arranged in the stacking direction to form a second bundle portion, a part of the tabs in the first bundle portion and a part of the tabs in the second bundle portion being joined to the first joined portion and the second joined portion.

4 Claims, 27 Drawing Sheets

POWER STORAGE DEVICE

This nonprovisional application is based on Japanese Patent Application No. 2017-159417 filed on Aug. 22, 2017 with the Japan Patent Office, the entire contents of which are hereby incorporated by reference.

BACKGROUND

Field

The present disclosure relates to a power storage device.

Description of the Background Art

A secondary battery includes an electrode assembly, a positive electrode collector terminal, a negative electrode collector terminal, and a housing case. The electrode assembly includes a positive electrode and a negative electrode. The positive electrode collector terminal is welded to the positive electrode, and the negative electrode collector terminal is welded to the negative electrode.

Conventionally, various types of structures and methods for welding positive electrode and negative electrode collector terminals and respective electrodes have been proposed.

A secondary battery described in Japanese Patent Laying-Open No. 2011-155015 includes an electrode assembly, a positive electrode current collector and a negative electrode current collector.

The electrode assembly includes a plurality of positive electrode sheets and a plurality of negative electrode sheets. The positive electrode sheet includes a metal foil and a positive electrode active material applied onto the metal foil. The metal foil is provided with a positive electrode tab having no positive electrode active material applied thereonto. The negative electrode sheet includes a metal foil and a negative electrode active material applied onto the metal foil. The metal foil is provided with a negative electrode tab having no negative electrode active material applied thereonto.

The positive electrode current collector includes a positive electrode lead to which a plurality of positive electrode tabs are welded, and the negative electrode current collector includes a negative electrode lead to which a plurality of negative electrode tabs are welded. The plurality of positive electrode tabs are welded to front and rear surfaces of the positive electrode lead.

A secondary battery described in Japanese Patent Laying-Open No. 2016-001561 includes an electrode assembly and a conductive member. The electrode assembly includes a plurality of negative electrode sheets, a plurality of positive electrode sheets, and a plurality of separators. The electrode assembly is formed by sequentially stacking the negative electrode sheet, the separator, the positive electrode sheet, and the separator.

The negative electrode sheet includes a metal foil and a negative electrode active material applied onto the metal foil. The metal foil is provided with a negative electrode tab that is not covered with the negative electrode active material. A plurality of negative electrode tabs are stacked on a surface of the conductive member.

When the negative electrode tabs are welded to the conductive member, the negative electrode tab of the first-layer negative electrode sheet is first welded to the conductive member. The negative electrode tab of the second-layer negative electrode sheet is welded to the first-layer negative electrode tab. Then, the negative electrode tab of each stacked negative electrode sheet is sequentially welded to the already-stacked negative electrode tab.

As described above, the plurality of stacked negative electrode tabs are welded and the stacked negative electrode tabs are welded to the conductive member.

A secondary battery described in Japanese Patent Laying-Open No. 2013-196959 includes an electrode assembly and a collector terminal. The electrode assembly is formed by sequentially stacking a positive electrode sheet, a separator and a negative electrode sheet. The positive electrode sheet is provided with a positive electrode tab, and the negative electrode sheet is provided with a negative electrode tab.

The collector terminal includes a first portion and a second portion. A slit into which a plurality of positive electrode tabs are inserted is formed in the first portion. The plurality of positive electrode tabs are inserted into the slit of the first portion. The positive electrode tabs inserted into the slit pass through the slit, and then, are bent along a surface of the first portion and sandwiched between the first portion and the second portion.

SUMMARY

As for the secondary battery described in Japanese Patent Laying-Open No. 2011-155015, the plurality of positive electrode tabs are welded to one positive electrode lead. Since the positive electrode tab needs to be welded to the positive electrode lead also in the positive electrode provided at a position apart from the positive electrode lead, an increase in length of the positive electrode tab of each positive electrode sheet is required.

On the other hand, a length of an excess portion of the positive electrode tab is long in the positive electrode sheet provided at a position close to the positive electrode lead. This excess portion needs to be housed in the secondary battery, and thus, there arises a need to secure a space for housing the excess portion in the secondary battery.

As a result, a ratio of occupancy of the active material in the secondary battery may be reduced, and thus, a battery capacity may be reduced.

As for the secondary battery described in Japanese Patent Laying-Open No. 2016-001561, the plurality of negative electrode tabs are stacked on the conductive member. Therefore, in order to allow the negative electrode tab of the negative electrode sheet disposed at a position apart from the conductive member to reach the conductive member, it is necessary to increase a length of the negative electrode tab.

Therefore, a space for housing the long negative electrode tab in the secondary battery is required, and thus, a battery capacity is reduced.

As for the secondary battery described in Japanese Patent Laying-Open No. 2013-196959, the plurality of positive electrode tabs are sandwiched by the collector terminal. Therefore, also in the positive electrode sheet provided at a position apart from the collector terminal, an increase in length of the positive electrode tab is required for connection with the collector terminal.

As a result, there arises a need to house the long positive electrode tab in the secondary battery, and thus, a battery capacity is reduced.

Although the secondary battery including the electrode assembly has been described above, a similar problem also arises in, for example, a capacitor including a plurality of capacitor cells.

That is, a similar problem also arises in a power storage device including a power storage assembly including a plurality of electrode plates.

The present disclosure has been made in view of the above-described problem and an object thereof is to provide a power storage device including a power storage assembly including a plurality of electrode plates, with improved power storage capacity.

A power storage device according to the present disclosure includes: a power storage assembly including a plurality of electrode plates stacked in a stacking direction; and a plurality of joined portions formed in the power storage assembly. Each of the plurality of electrode plates includes an electrode plate main body and a tab formed so as to protrude from an outer peripheral edge portion of the electrode plate main body. The plurality of electrode plates are disposed such that the tabs are arranged in the stacking direction. The plurality of joined portions include a first joined portion configured to join the plurality of tabs arranged in the stacking direction to form a first bundle portion, and a second joined portion configured to join the plurality of tabs arranged in the stacking direction to form a second bundle portion. A part of the tabs in the first bundle portion and a part of the tabs in the second bundle portion are joined to the first joined portion and the second joined portion. When the first joined portion and the second joined portion are viewed from the stacking direction, the first joined portion and the second joined portion are formed so as to be spaced apart from each other.

According to the above-described power storage device, a part of the first bundle portion and a part of the second bundle portion are joined to the first joined portion and the second joined portion, and thus, the first bundle portion and the second bundle portion enter an electrically conductive state. Therefore, by joining a collector terminal to at least one of the first bundle portion and the second bundle portion, the plurality of tabs can be electrically connected to the collector terminal.

The plurality of tabs are divided into the first bundle portion and the second bundle portion, and each bundle portion is joined to each joined portion. Therefore, in the first bundle portion, a distance between the electrode plate main body of each electrode plate and the first joined portion is short, and thus, each tab can be joined to the first joined portion even when a length of the tab of each electrode plate is reduced. Similarly, in the second bundle portion as well, each tab can be joined to the second joined portion even when a length of each tab is reduced.

As described above, the length of each tab can be reduced, and thus, a ratio of occupancy of the tabs in the power storage device can be reduced and a power storage capacity can be improved.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
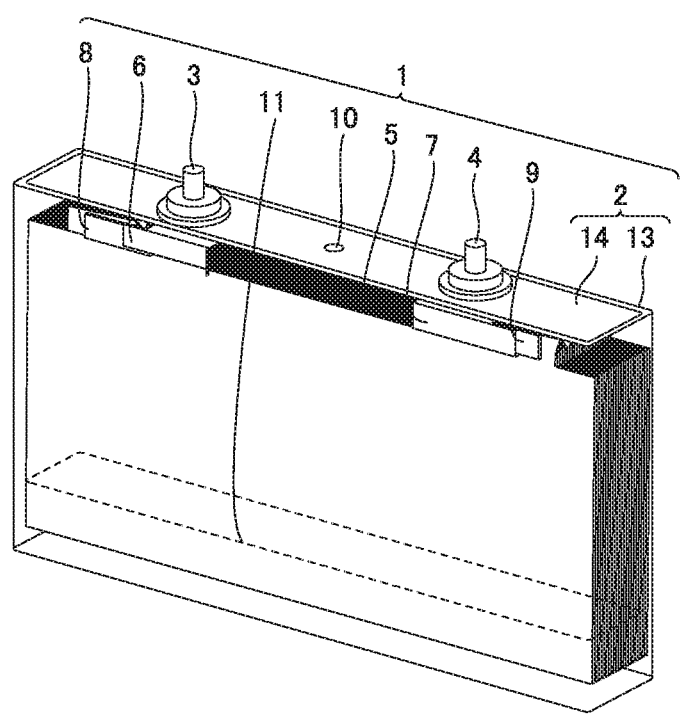
FIG. 1 is a perspective view showing a power storage device according to the present embodiment.

Power storage devices according to first and second embodiments will be described with reference to FIGS. 1 to 41. The same or substantially the same components of the configurations shown in FIGS. 1 to 41 are denoted by the same reference characters and redundant description will not be repeated.

First Embodiment

Figure 2:
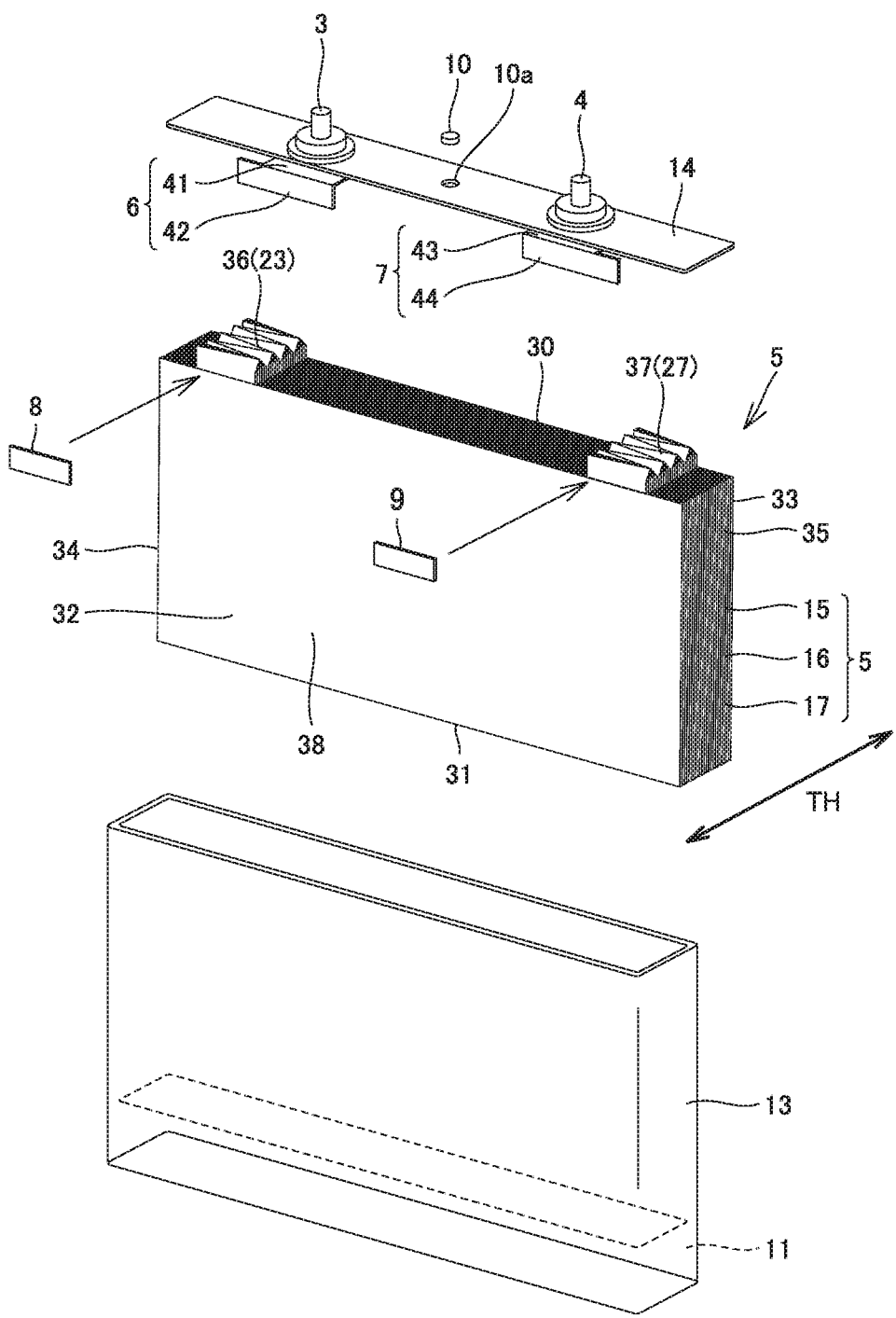
FIG. 2 is an exploded perspective view showing power storage device 1.

FIG. 1 is a perspective view showing a power storage device according to the first embodiment. In this FIG. 1, the interior of a housing case 2 can be seen. FIG. 2 is an exploded perspective view showing power storage device 1.

Power storage device 1 includes housing case 2, a positive electrode external terminal 3, a negative electrode external terminal 4, an electrode assembly 5, a positive electrode collector terminal 6, a negative electrode collector terminal 7, conductive plates 8 and 9, a sealing member 10, and an electrolyte 11.

Electrode assembly 5, positive electrode collector terminal 6, negative electrode collector terminal 7, conductive plates 8 and 9, and electrolyte 11 are housed in housing case 2.

Housing case 2 includes a case main body 13 and a lid 14. An opening that is open upward is formed in case main body 13. Lid 14 is welded to an opening edge portion of case main body 13. Case main body 13 and lid 14 are made of aluminum, aluminum alloy or the like.

Positive electrode external terminal 3 and negative electrode external terminal 4 are disposed on an upper surface of lid 14. Positive electrode external terminal 3 and negative electrode external terminal 4 are spaced apart from each other.

Positive electrode collector terminal 6 and negative electrode collector terminal 7 are disposed on a lower surface of lid 14. Positive electrode collector terminal 6 is disposed below positive electrode external terminal 3 and connected to positive electrode external terminal 3. Negative electrode collector terminal 7 is disposed below negative electrode external terminal 4 and connected to negative electrode external terminal 4.

Electrode assembly 5 includes a plurality of positive electrode sheets 15, a plurality of separators 16, and a plurality of negative electrode sheets 17.

Figure 3:
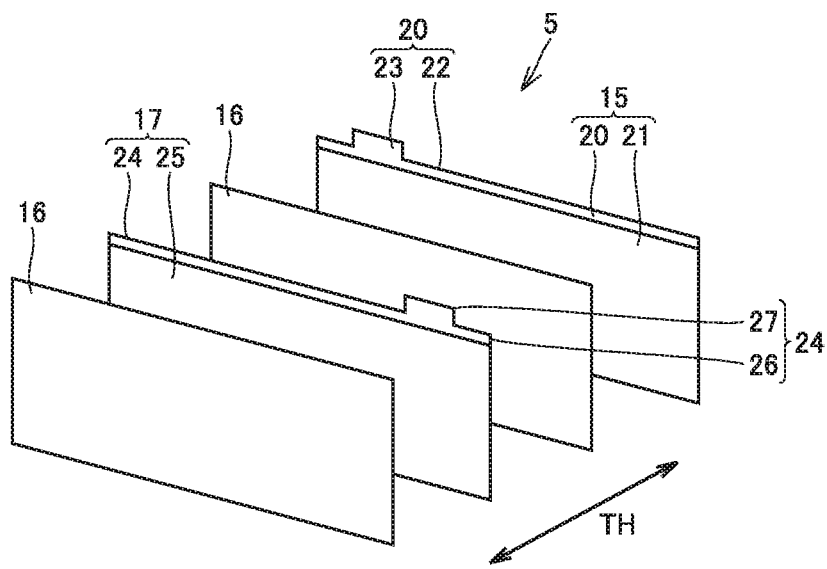
FIG. 3 is an exploded perspective view of a part of an electrode assembly 5.

FIG. 3 is an exploded perspective view of a part of electrode assembly 5. Electrode assembly 5 is formed by sequentially stacking positive electrode sheet 15, separator 16, negative electrode sheet 17, and separator 16. A stacking direction of the sheets is denoted by a stacking direction TH.

Positive electrode sheet 15 includes a metal foil (electrode plate) 20 and a positive electrode composite material layer 21. Metal foil 20 is made of aluminum, aluminum alloy or the like. Positive electrode composite material layers 21 are formed on front and rear surfaces of metal foil 20. Positive electrode composite material layer 21 includes a positive electrode active material, a binder and the like.

Metal foil 20 includes a foil main body (electrode assembly main body) 22 and a positive electrode tab (tab) 23. Foil main body 22 is formed to have a rectangular shape and occupies most of metal foil 20. Positive electrode composite material layers 21 are formed on front and rear surfaces of foil main body 22. Positive electrode tab 23 is formed so as to protrude from an outer peripheral edge portion of foil main body 22. In the example shown in this FIG. 3, positive electrode tab 23 is formed so as to protrude from an upper edge of foil main body 22.

Negative electrode sheet 17 includes a metal foil (electrode plate) 24 and a negative electrode composite material layer 25. Metal foil 24 is made of copper or copper alloy. Negative electrode composite material layer 25 includes a negative electrode active material, a binder and the like. Negative electrode composite material layers 25 are formed on front and rear surfaces of metal foil 24.

Metal foil 24 includes a foil main body 26 and a negative electrode tab 27. Foil main body 26 is formed to have a rectangular shape and occupies most of metal foil 24. Negative electrode composite material layers 25 are formed on front and rear surfaces of foil main body 26. Negative electrode tab 27 is formed so as to protrude from an outer peripheral edge portion of foil main body 26. In the example shown in this FIG. 3, negative electrode tab 27 is formed so as to protrude from an upper edge of foil main body 26. Positive electrode tab 23 is disposed on one end side of electrode assembly 5, and negative electrode tab 27 is disposed on the other end side of electrode assembly 5.

In FIGS. 2 and 3, electrode assembly 5 includes a stacked main body 38, a positive electrode 36 and a negative electrode 37. Stacked main body 38 is formed by stacking foil main bodies 22 and 26, positive electrode composite material layers 21, negative electrode composite material layers 25, and separators 16.

Stacked main body 38 is formed to have a substantially rectangular parallelepiped shape. Stacked main body 38 includes an upper surface 30, a lower surface 31, main side surfaces 32 and 33, and end surfaces 34 and 35.

Positive electrode 36 and negative electrode 37 are formed on upper surface 30. Positive electrode 36 is formed on the end surface 34 side, and negative electrode 37 is formed on the end surface 35 side. Positive electrode 36 is formed by a plurality of stacked positive electrode tabs 23. A detailed configuration of positive electrode 36 will be described below. Negative electrode 37 is formed by a plurality of stacked negative electrode tabs 27. Negative electrode 37 is formed similarly to positive electrode 36.

Conductive plate 8 is welded to positive electrode 36. Conductive plate 8 is welded to positive electrode collector terminal 6. Positive electrode collector terminal 6 includes a connected piece 41 and a welded piece 42. Connected piece 41 is connected to positive electrode external terminal 3, and welded piece 42 is connected to connected piece 41 and welded to conductive plate 8. As a result, positive electrode 36 is electrically connected to positive electrode external terminal 3.

Conductive plate 9 is welded to negative electrode 37 and welded to negative electrode collector terminal 7. Negative electrode collector terminal 7 includes a connected piece 43 and a welded piece 44. Connected piece 43 is connected to negative electrode external terminal 4. Welded piece 44 is connected to connected piece 43 and welded to conductive plate 9. As a result, negative electrode 37 is electrically connected to negative electrode external terminal 4.

Figure 4:
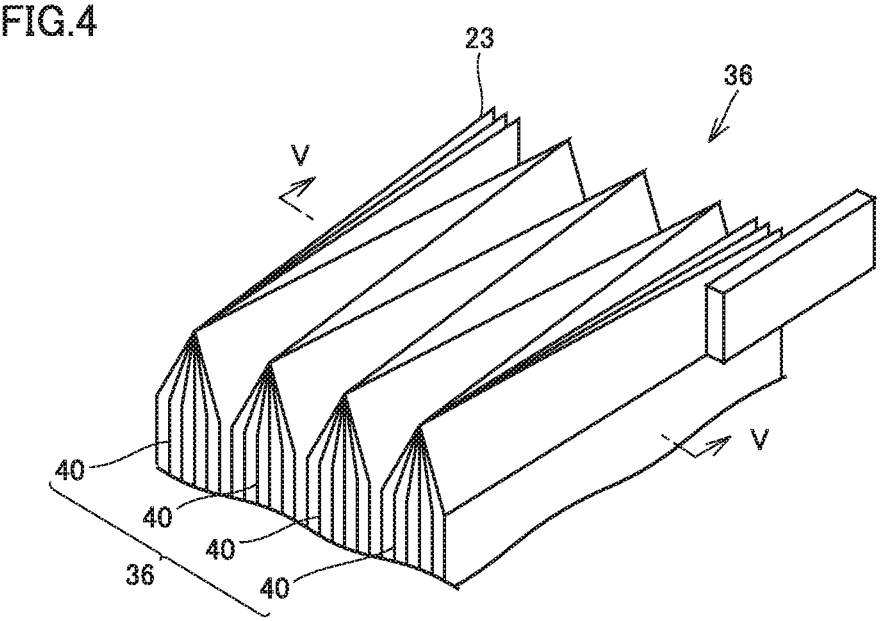
FIG. 4 is a perspective view showing a positive electrode.

Next, the configuration of positive electrode 36 will be described. FIG. 4 is a perspective view showing positive electrode 36. Positive electrode 36 includes a plurality of bundles 40. Each bundle 40 is formed by a plurality of positive electrode tabs 23.

Figure 5:
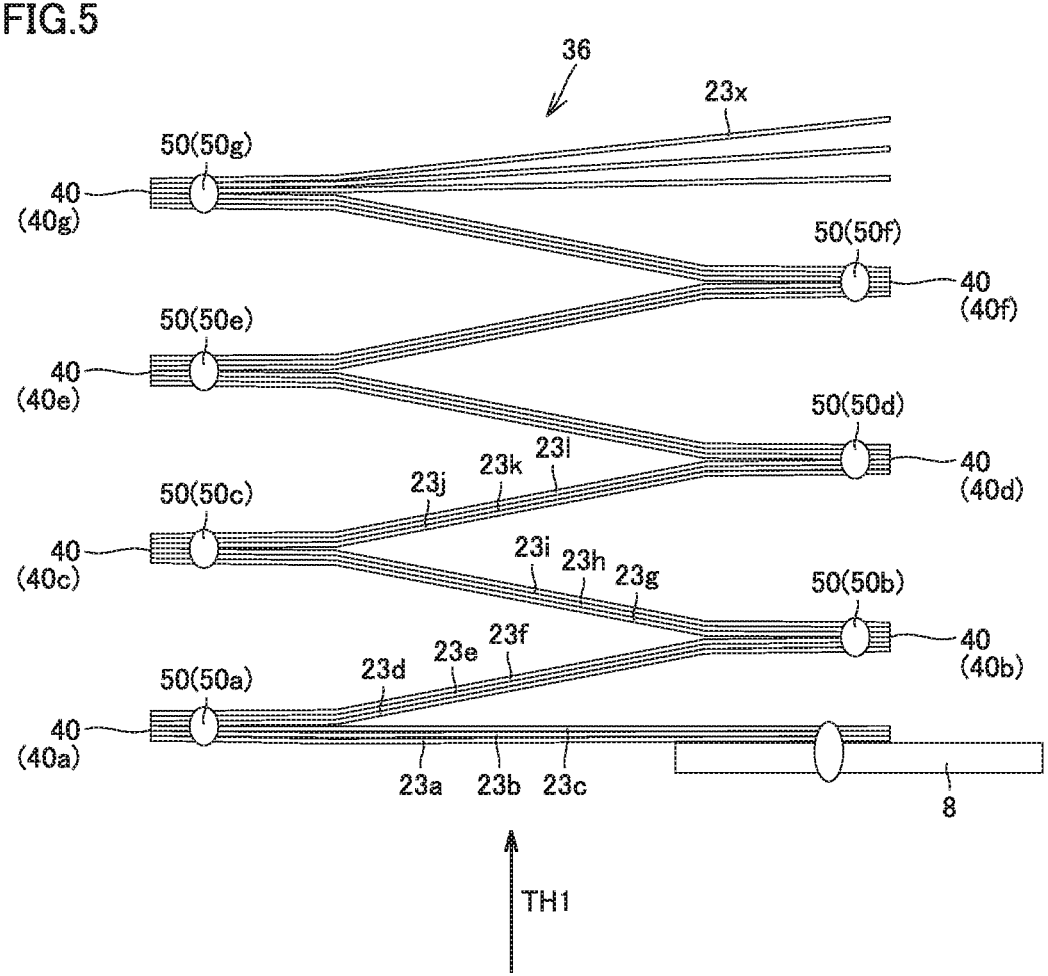
FIG. 5 is a cross-sectional view taken along line V-V shown in FIG. 4.

FIG. 5 is a cross-sectional view taken along line V-V shown in FIG. 4. Positive electrode 36 is formed by stacking the plurality of positive electrode tabs 23 in a stacking direction TH1. Each bundle 40 is formed by welding one ends of the plurality of positive electrode tabs 23 with a welded portion 50.

In the example shown in this FIG. 5, bundles 40a to 40g are included. Bundles 40a to 40g are formed by bundling the ends of the plurality of positive electrode tabs 23 with welded portions 50a to 50g, respectively.

Bundles 40a to 40g are disposed in a staggered manner in a width direction of positive electrode 36 and are connected to one another by the plurality of positive electrode tabs 23.

Specifically, bundle 40a is formed by bundling one ends of positive electrode tabs 23a to 23f with welded portion 50a, and is disposed on one end side of positive electrode 36.

Bundle 40b is disposed on the other end side of positive electrode 36 and is disposed closer to main side surface 32 of electrode assembly 5 than bundle 40a. Bundle 40b is formed by welding the other ends of three positive electrode tabs 23d to 23f, which is a part of the plurality of positive electrode tabs 23a to 23f forming bundle 40a, and the other ends of other three positive electrode tabs 23g to 23i with welded portion 50b.

Bundle 40c is disposed on one end side of positive electrode 36 and is disposed closer to main side surface 32 than bundle 40b. Bundle 40c is formed by welding one ends of three positive electrode tabs 23g to 23i, which is a part of the plurality of positive electrode tabs 23d to 23i forming bundle 40b, and one ends of other three positive electrode tabs 23j to 23i with welded portion 50c. The other bundles 40d to 40g are also formed similarly to bundles 40a to 40c.

Therefore, the plurality of positive electrode tabs 23 forming each of bundles 40a to 40g are electrically connected to one another.

Conductive plate 8 is welded to the other end side of positive electrode tabs 23a to 23c. Therefore, conductive plate 8 is electrically connected to all of positive electrode tabs 23 forming positive electrode 36.

Figure 6:
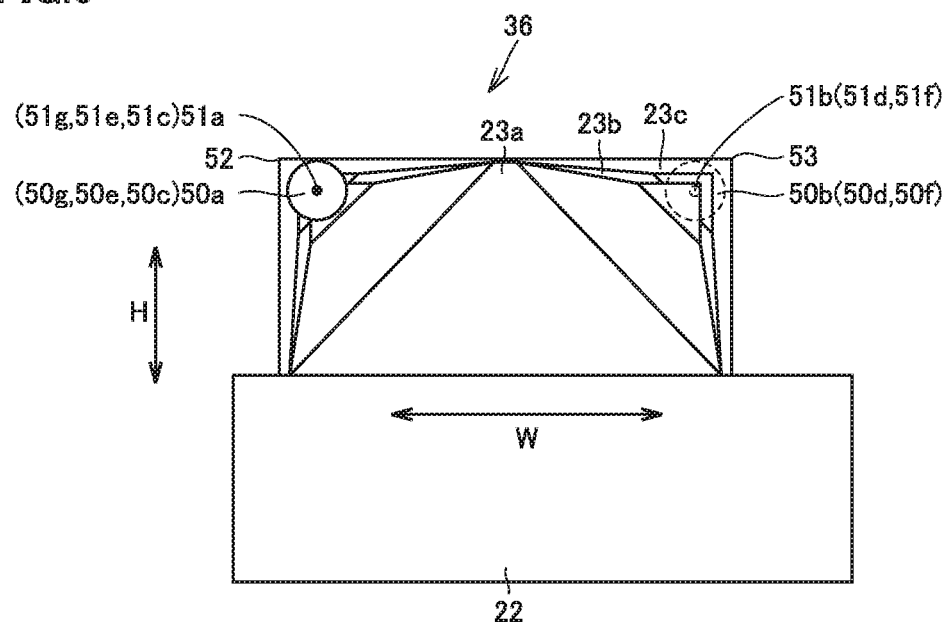
FIG. 6 is a front view of positive electrode 36 when viewed from a stacking direction TH1 shown in FIG. 5.

FIG. 6 is a front view of positive electrode 36 when viewed from stacking direction TH1 shown in FIG. 5. Referring to FIGS. 5 and 6, welded portion (first joined portion) 50a forming bundle (first bundle portion) 40a and welded portion (second joined portion) 50b forming bundle (second bundle portion) 40b are formed so as to be spaced apart from each other. Similarly, welded portions (first joined portions) 50c, 50e and 50g forming bundles (first bundle portions) 40c, 40e and 40g and welded portions (second joined portions) 50d and 50f forming bundles (second bundle portions) 40d and 40f are formed so as to be spaced apart from one another.

A length of each positive electrode tab 23 before being welded in a width direction W is longer than a length of each positive electrode tab 23 before being welded in a protruding direction H. The length of positive electrode tab 23 in width direction W is approximately twice as long as the length of positive electrode tab 23 in protruding direction H. Width direction W of positive electrode tab 23 refers to a direction along the outer peripheral edge portion of foil main body 22, and protruding direction H refers to a direction in which positive electrode tab 23 protrudes from the outer peripheral edge portion of foil main body 22.

For example, the length of positive electrode tab 23 in width direction W is not less than 16 mm and approximately 25 mm, and the length of positive electrode tab 23 in protruding direction H is not less than 8 mm and approximately 10 mm.

Each positive electrode tab 23 is formed to have a rectangular shape. Positive electrode tab 23 includes both side edges and an upper edge, and the lower edge side is connected to foil main body 22. Each side edge and the upper edge form corners 52 and 53.

Welded portions (first joined portions) 50a, 50c, 50e, and 50g are formed on or near corner 52 of each positive electrode tab 23. Welded portions (second joined portions) 50b, 50d and 50f are formed on corner 53. A distance between each of welded portions 50a, 50c, 50e, and 50g and corner 52 as well as a distance between each of welded portions 50b, 50d and 50f and corner 53 are approximately 5 mm.

As described above, welded portions (first joined portions) 50a, 50c, 50e, and 50g are formed on one end side of positive electrode 36, and welded portions (second joined portions) 50b, 50d and 50f are formed on the other end side of positive electrode 36.

A method for manufacturing power storage device 1 configured as mentioned above will be described.

Figure 7:
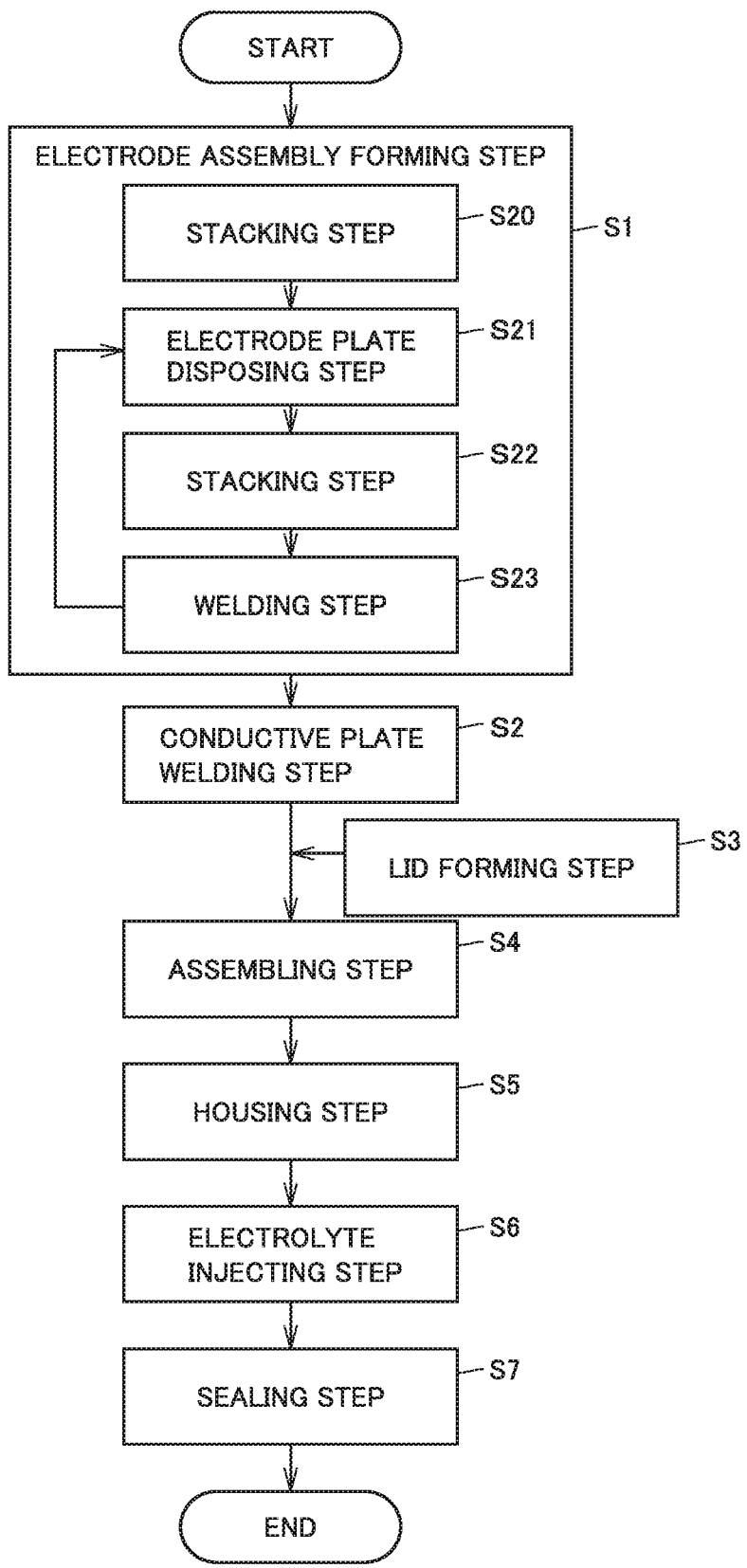
FIG. 7 is a process flowchart showing a process of manufacturing power storage device 1.

FIG. 7 is a process flowchart showing a process of manufacturing power storage device 1. The process of manufacturing power storage device 1 includes an electrode assembly forming step S1, a conductive plate welding step S2, a lid forming step S3, an assembling step S4, a housing step S5, an electrolyte injecting step S6, and a sealing step S7.

Electrode assembly forming step S1 includes a stacking step S20, an electrode plate disposing step S21, a stacking step S22, and a welding step S23, and electrode plate disposing step S21, stacking step S22 and welding step S23 are repeatedly performed. In this electrode assembly forming step S1, a holder is used.

Figure 8:
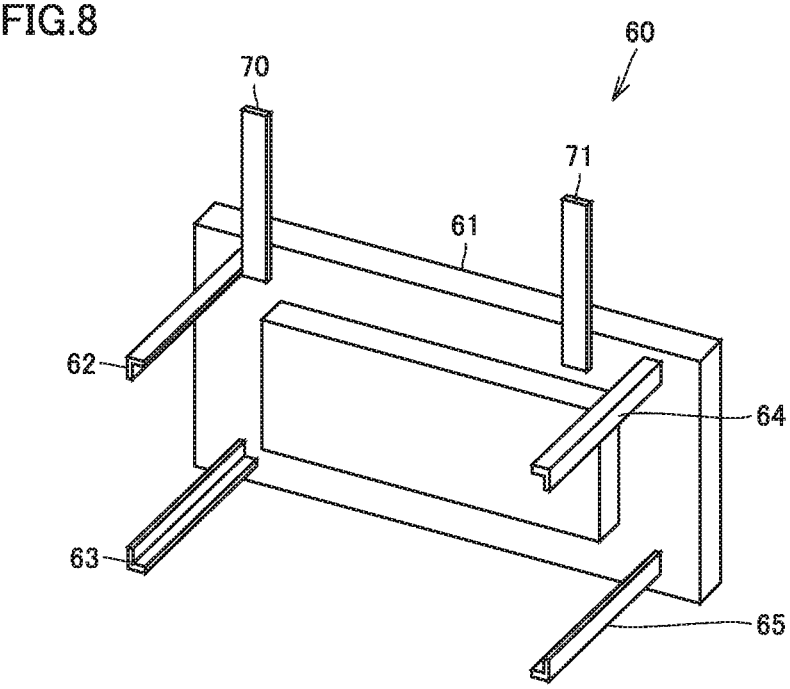
FIG. 8 is a perspective view showing a holder 60.

FIG. 8 is a perspective view showing a holder 60. Holder 60 includes a base 61, support shafts 62, 63, 64, and 65, and electrode plates 70 and 71.

Base 61 is formed to have a plate shape. Support shafts 62, 63, 64, and 65 are formed so as to protrude from a front surface of base 61. Support shafts 62 and 63 and support shafts 64 and 65 are spaced apart from each other in a width direction of base 61.

Support shafts 62 and 64 are disposed on the upper end side of base 61, and support shafts 63 and 65 are disposed on the lower end side of base 61. Electrode plates 70 and 71 are provided so as to be movable with respect to base 61.

Figure 9:
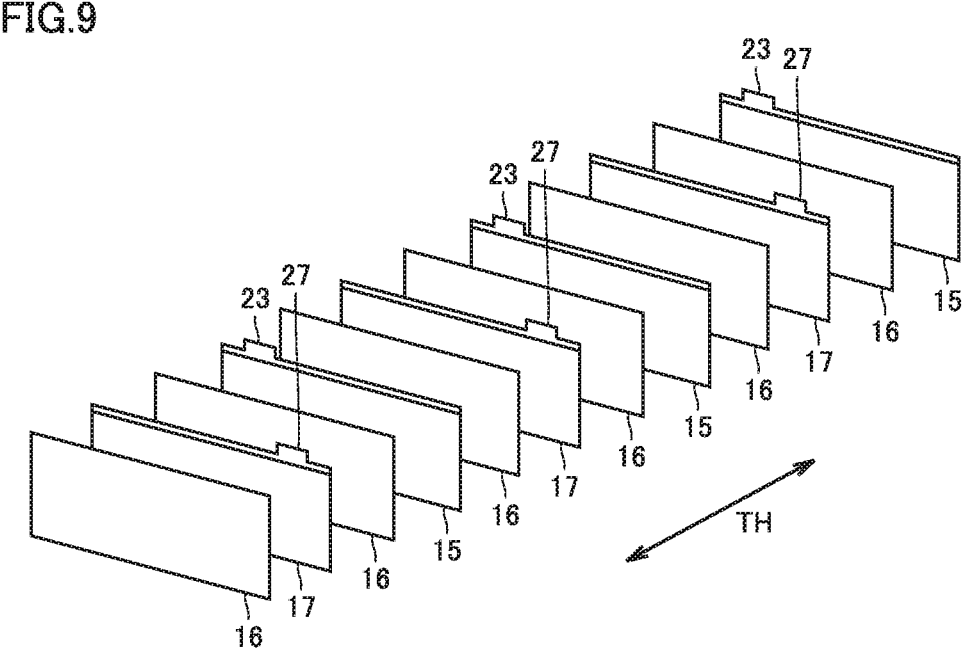
FIG. 9 is a perspective view showing a stacking step S20.
Figure 10:
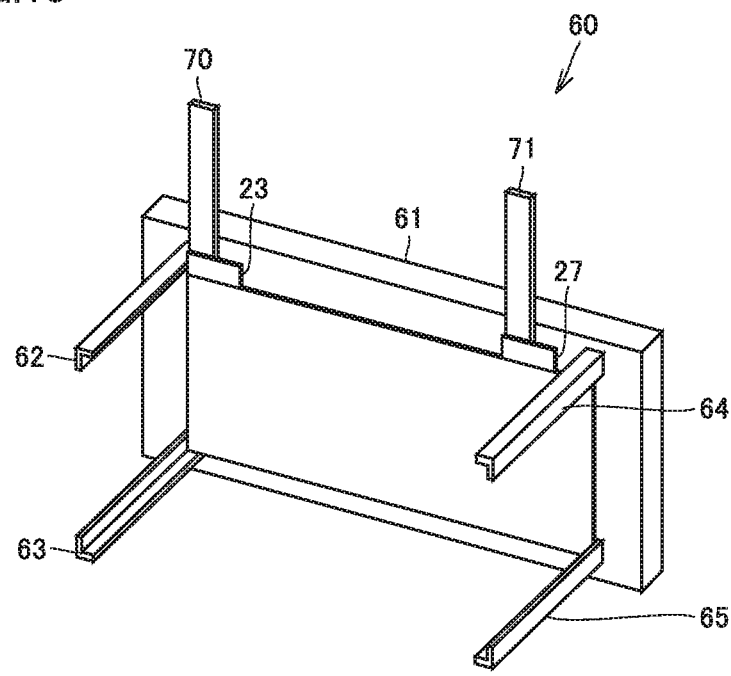
FIG. 10 is a perspective view showing stacking step S20.

FIGS. 9 and 10 are perspective views showing stacking step S20. In FIG. 9, positive electrode sheet 15, separator 16, negative electrode sheet 17, and separator 16 are sequentially stacked in stacking direction TH. In the example shown in FIG. 9, three positive electrode sheets 15, six separators 16 and three negative electrode sheets 17 are stacked.

As shown in FIGS. 9 and 10, three positive electrode tabs 23 are stacked in stacking direction TH, and three negative electrode tabs 27 are stacked in stacking direction TH.

The respective sheets are supported by support shafts 62 to 65 and a stacked body in which the respective sheets are stacked is formed.

Figure 11:
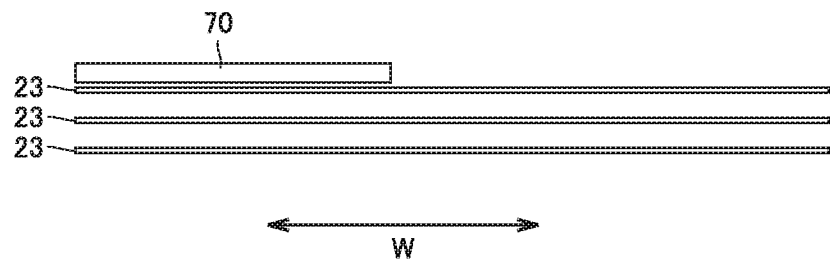
FIG. 11 is a plan view schematically showing a configuration of positive electrode tabs 23 and the surroundings thereof.

FIG. 11 is a plan view schematically showing a configuration of positive electrode tabs 23 and the surroundings thereof. As shown in this FIG. 11, three positive electrode tabs 23 are stacked and electrode plate 70 is disposed on the rear surface side of a stacked body in which positive electrode tabs 23 are stacked. Electrode plate 70 is disposed on one end side of positive electrode tabs 23 in width direction W.

Figure 12:
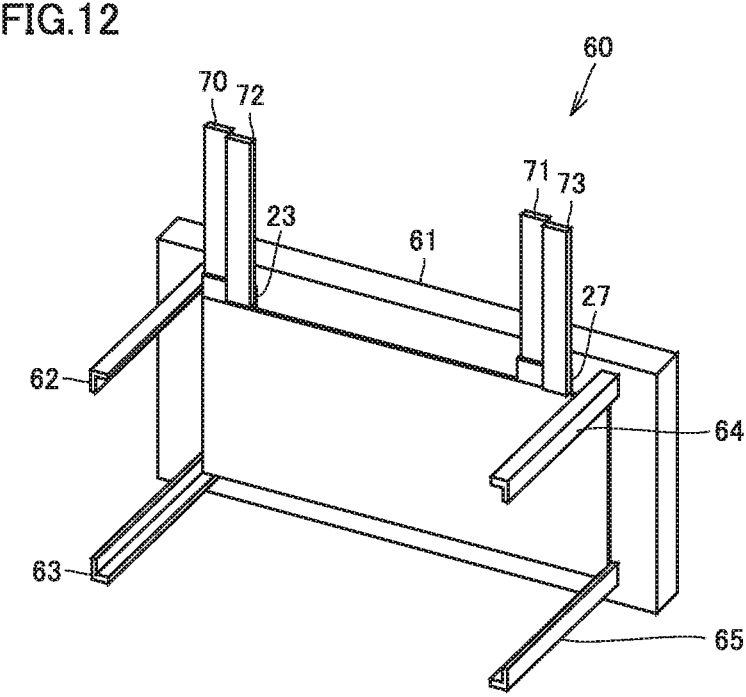
FIG. 12 is a perspective view showing an electrode plate disposing step S21.

FIG. 12 is a perspective view showing electrode plate disposing step S21. In electrode plate disposing step S21, electrode plates 72 and 73 are disposed. Electrode plate 72 is disposed on the front surface side of the stacked body of positive electrode tabs 23. Electrode plate 73 is disposed on the front surface side of a stacked body of negative electrode tabs 27.

Figure 13:
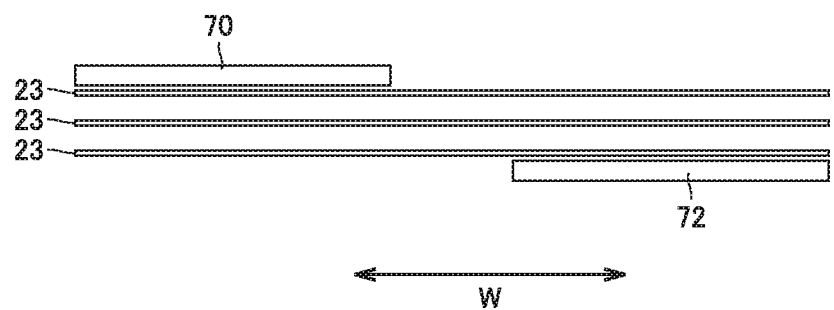
FIG. 13 is a plan view showing a configuration of positive electrode tabs 23 and the surroundings thereof.

FIG. 13 is a plan view showing a configuration of positive electrode tabs 23 and the surroundings thereof. Electrode plate 72 is disposed on the other end side of positive electrode tabs 23 in width direction W.

Figure 14:
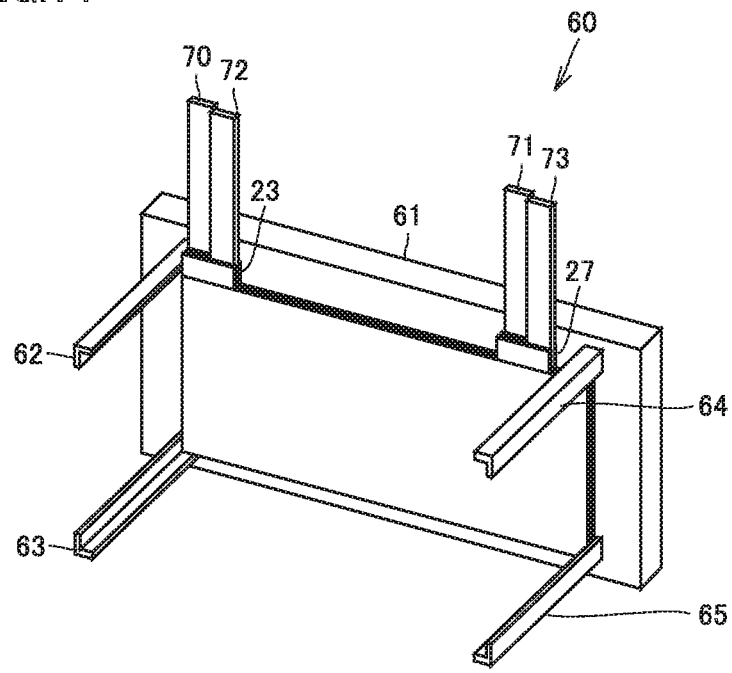
FIG. 14 is a perspective view showing a stacking step S22.

FIG. 14 is a perspective view showing stacking step S22. In stacking step S22, positive electrode sheets 15, separators 16 and negative electrode sheets 17 are sequentially stacked after electrode plates 72 and 73 are disposed. In this stacking step S22 as well, three positive electrode sheets 15, six separators 16 and three negative electrode sheets 17 are stacked.

Figure 15:
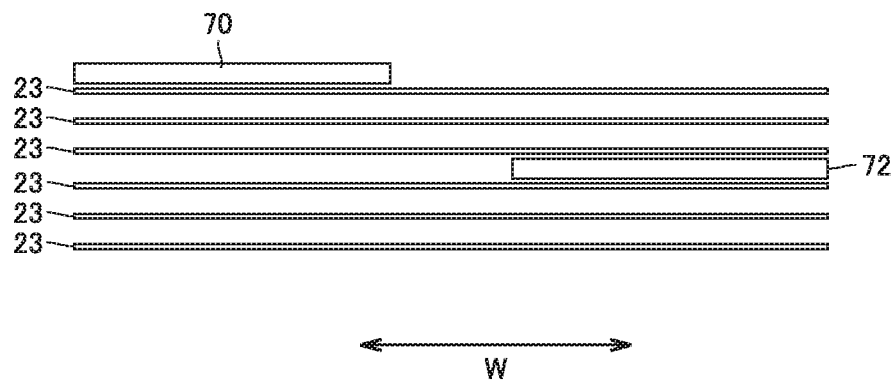
FIG. 15 is a plan view showing a configuration of the surroundings of positive electrode tabs 23 in a welding step S23.

FIG. 15 is a plan view showing a configuration of the surroundings of positive electrode tabs 23 in welding step S23. In the example shown in this FIG. 15, three positive electrode tabs 23 are stacked on the front surface side of electrode plate 72. On the negative electrode side as well, three negative electrode tabs 27 are stacked on the front surface side of electrode plate 73.

Figure 16:
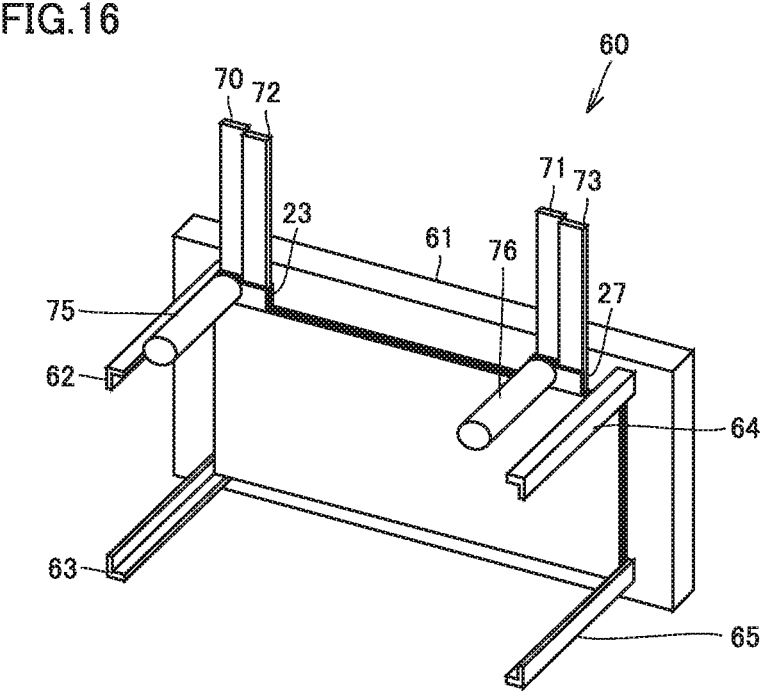
FIG. 16 is a perspective view showing welding step S23.

FIG. 16 is a perspective view showing welding step S23. In welding step S23, an electrode shaft 75 is disposed on the front surface side of the stacked body of positive electrode tabs 23, and an electrode shaft 76 is disposed on the front surface side of the stacked body of negative electrode tabs 27.

Figure 17:
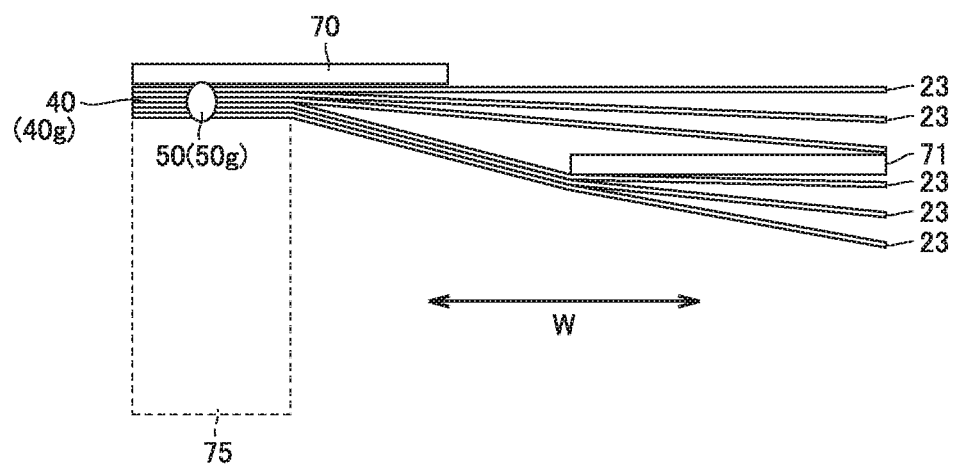
FIG. 17 is a plan view showing a configuration of positive electrode tabs 23 and the surroundings thereof.

FIG. 17 is a plan view showing a configuration of positive electrode tabs 23 and the surroundings thereof. The plurality of stacked positive electrode tabs 23 are sandwiched between electrode plate 70 and electrode shaft 75. Then, a current is applied between electrode plate 70 and electrode shaft 75 to thereby form welded portion 50g. As a result, the one end sides of the plurality of stacked positive electrode tabs 23 are joined to one another. Bundle 40g is thus formed. In the example shown in this FIG. 17, six positive electrode tabs 23 are welded to one another.

On the negative electrode tab 27 side as well, six negative electrode tabs 27 are similarly sandwiched between electrode shaft 76 and electrode plate 71, and electrode shaft 76 and electrode plate 71 form a welded portion. A bundle is thus formed.

Figure 18:
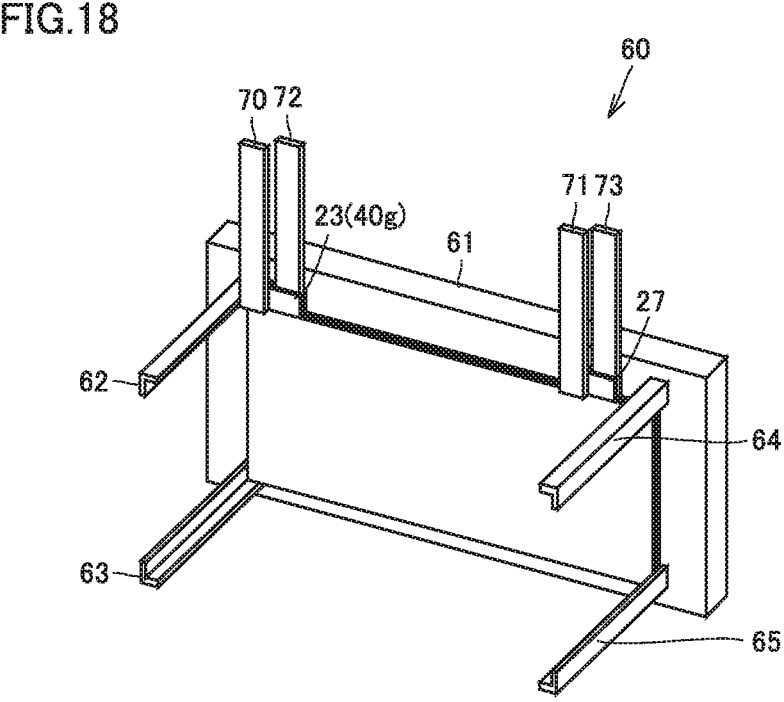
FIG. 18 is a perspective view showing second electrode plate disposing step S21.
Figure 19:
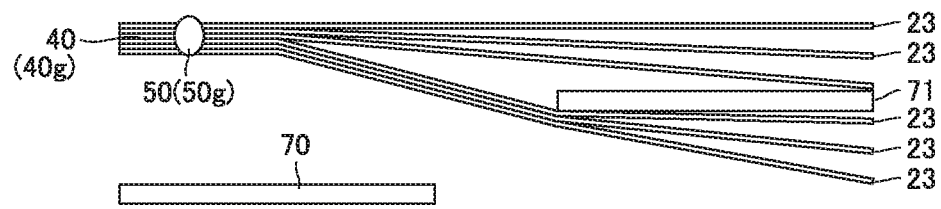
FIG. 19 is a plan view showing a configuration of positive electrode tabs 23 and the surroundings thereof.

FIG. 18 is a perspective view showing second electrode plate disposing step S21. FIG. 19 is a plan view showing a configuration of positive electrode tabs 23 and the surroundings thereof. In electrode plate disposing step S21 after stacking step S22, the positions of electrode plate 70 and electrode plate 71 are changed. Specifically, electrode plate 70 is disposed on a front surface of bundle 40g. Electrode plate 71 is also disposed on the front surface side of the bundle.

Figure 20:
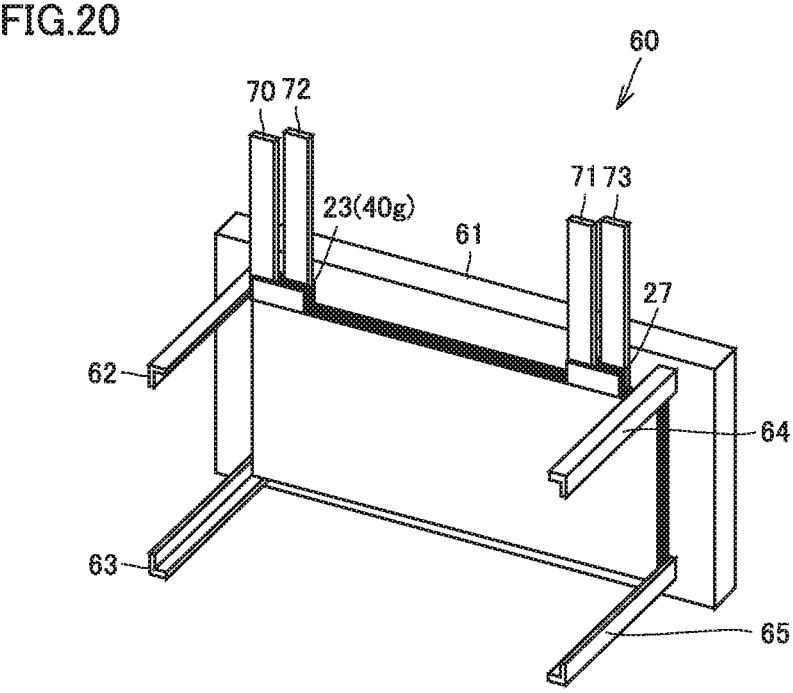
FIG. 20 is a perspective view showing stacking step S22 after second electrode plate disposing step S21.

FIG. 20 is a perspective view showing stacking step S22 after second electrode plate disposing step S21. In this stacking step S22, three positive electrode sheets 15, six separators 16 and three negative electrode sheets 17 are stacked. As a result, three positive electrode tabs 23 are stacked on the front surface side of electrode plate 70, and three negative electrode tabs 27 are stacked on the front surface side of electrode plate 71. The number of the stacked sheets can be changed as appropriate.

Figure 21:
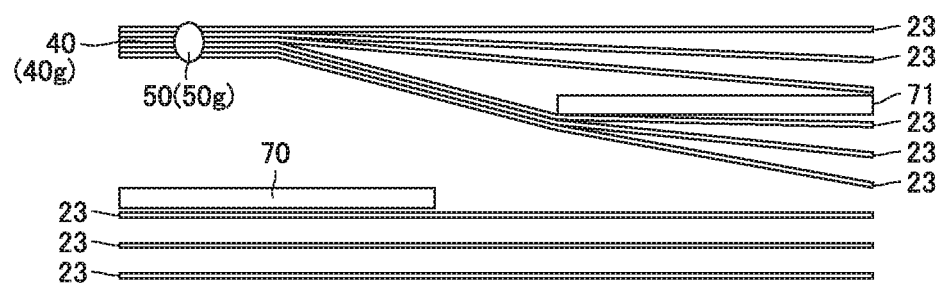
FIG. 21 is a plan view showing a configuration of positive electrode tabs 23 and the surroundings thereof.

FIG. 21 is a plan view showing a configuration of positive electrode tabs 23 and the surroundings thereof. Three positive electrode tabs 23 are stacked on the front surface side of electrode plate 70. On the negative electrode side as well, three negative electrode tabs 27 are disposed on the front surface side of electrode plate 71.

Figure 22:
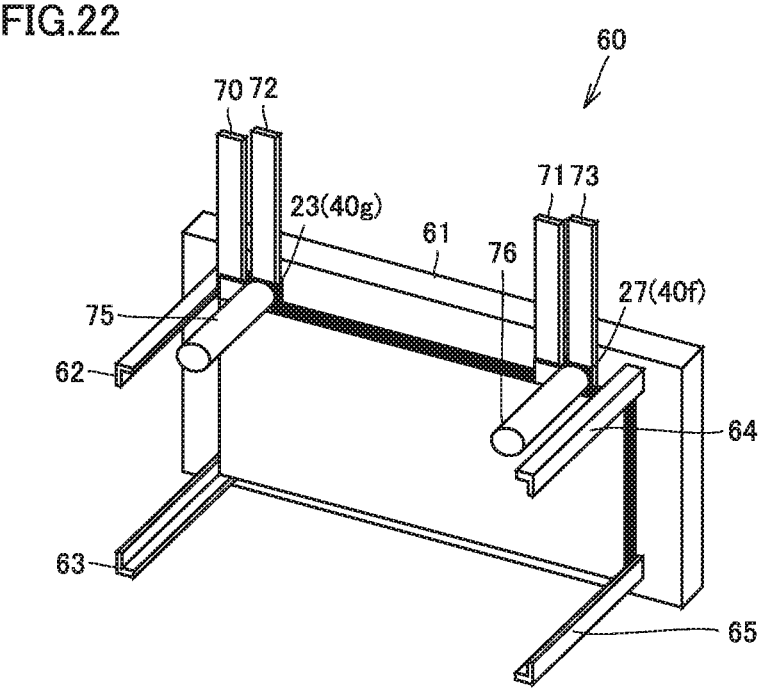
FIG. 22 is a perspective view showing second welding step S23.
Figure 23:
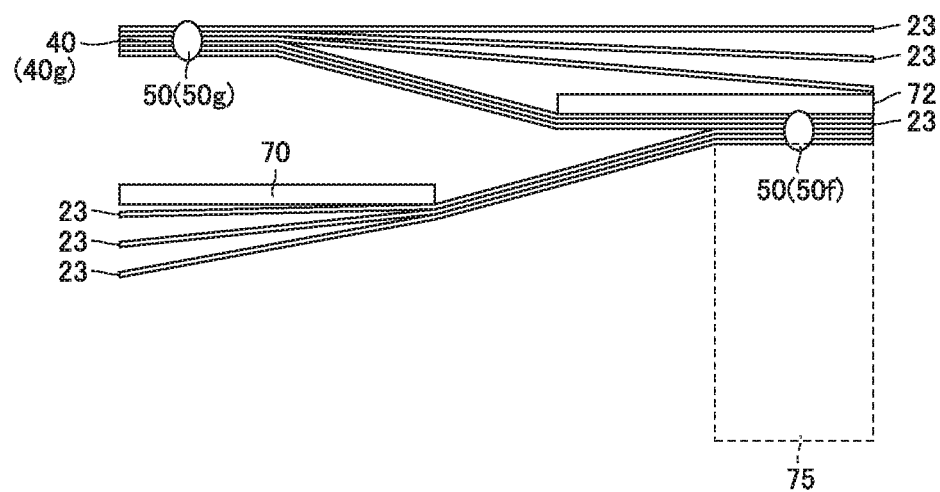
FIG. 23 is a plan view showing a configuration of positive electrode tabs 23 and the surroundings thereof in second welding step S23.

FIG. 22 is a perspective view showing second welding step S23, and FIG. 23 is a plan view showing a configuration of positive electrode tabs 23 and the surroundings thereof in second welding step S23. In second welding step S23, electrode shaft 75 is disposed on the front surface side of electrode plate 72. Six positive electrode tabs 23 are sandwiched between electrode plate 72 and electrode shaft 75.

Then, a current is applied between electrode plate 72 and electrode shaft 75 to thereby form welded portion 50f. Bundle 40f is thus formed. On the negative electrode side as well, electrode shaft 76 is disposed on the front surface side of electrode plate 72 and the plurality of negative electrode tabs 27 are sandwiched between electrode plate 72 and electrode shaft 76. Then, a current is applied between electrode plate 72 and electrode shaft 76 to thereby form a welded portion that bundles the plurality of negative electrode tabs 27.

Figure 24:
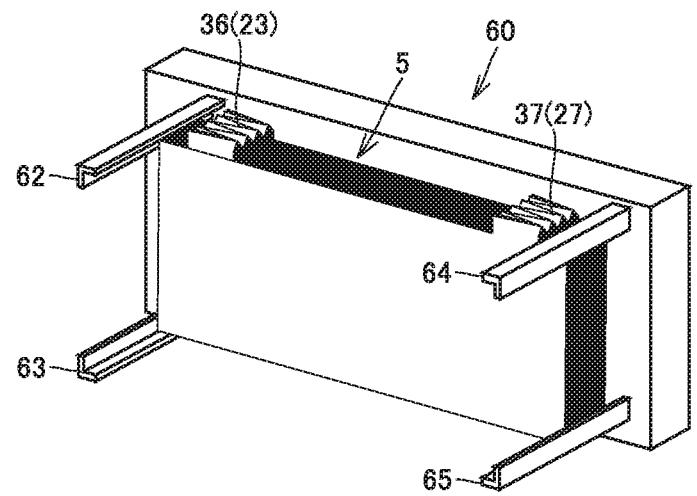
FIG. 24 is a perspective view showing holder 60 after electrode plate disposing step S21, stacking step S22 and welding step S23 are repeatedly performed.

FIG. 24 is a perspective view showing holder 60 after electrode plate disposing step S21, stacking step S22 and welding step S23 are repeatedly performed.

By repeatedly performing electrode plate disposing step S21, stacking step S22 and welding step S23, positive electrode 36 and negative electrode 37 are formed and electrode assembly 5 is formed.

Figure 25:
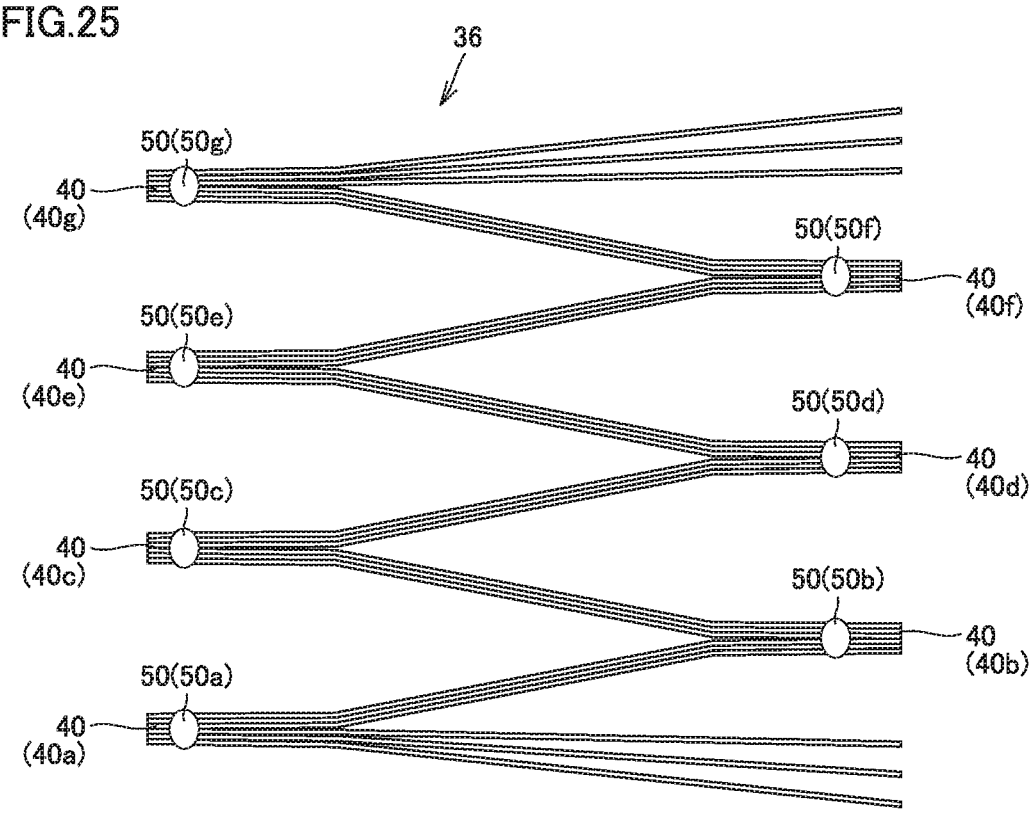
FIG. 25 is a plan view showing positive electrode 36 in the state shown in FIG. 24.

FIG. 25 is a plan view showing positive electrode 36 in the state shown in FIG. 24. As shown in this FIG. 25, positive electrode 36 having the plurality of bundles 40 formed therein is made by the plurality of welded portions 50.

Figure 26:
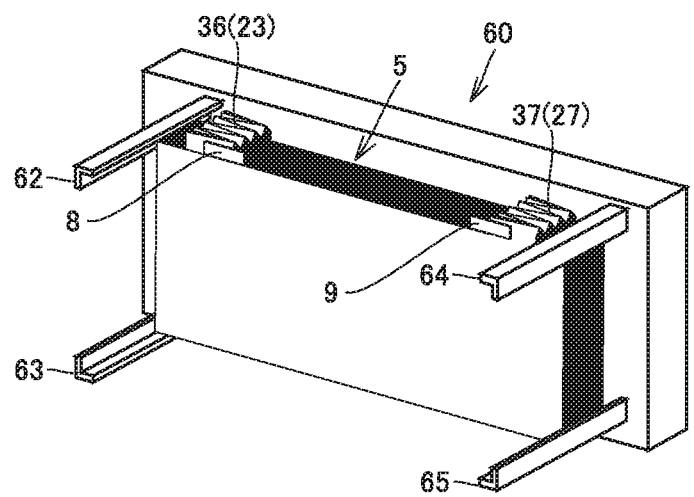
FIG. 26 is a perspective view showing a conductive plate welding step S2.

FIG. 26 is a perspective view showing conductive plate welding step S2. In conductive plate welding step S2, conductive plate 8 is welded to positive electrode 36 and conductive plate 9 is welded to negative electrode 37.

Figure 27:
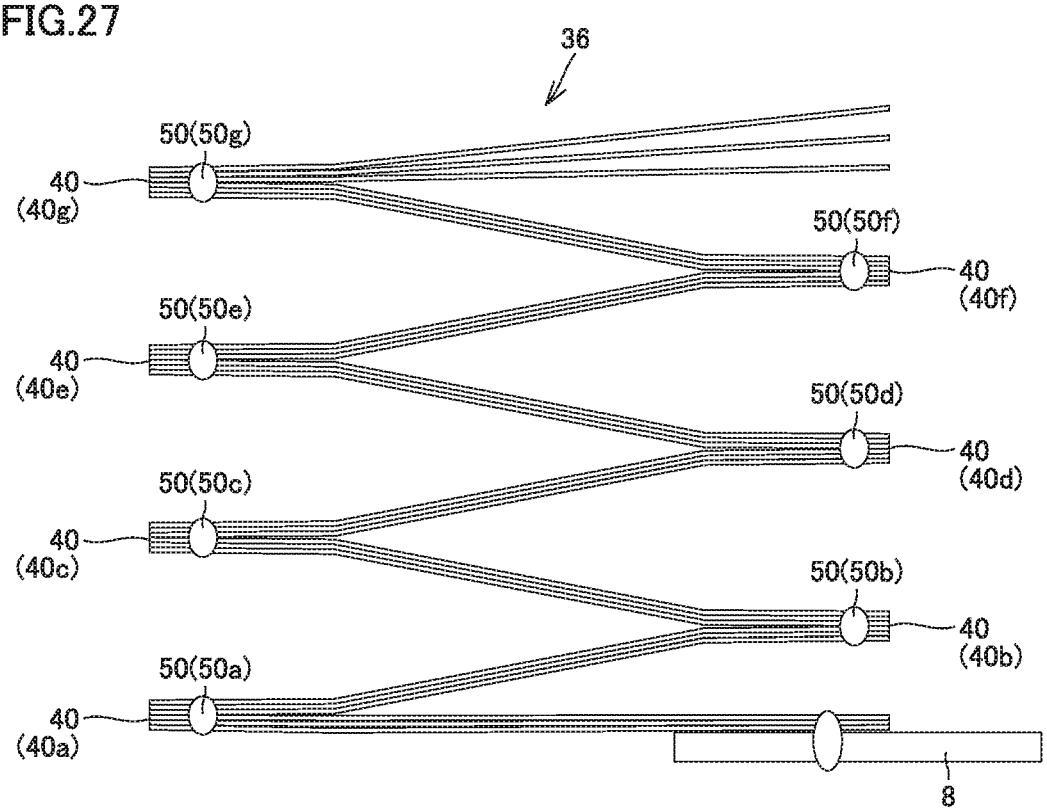
FIG. 27 is a plan view showing positive electrode 36 and a conductive plate 8.

FIG. 27 is a plan view showing positive electrode 36 and conductive plate 8. Conductive plate 8 is welded to the front surface side of positive electrode 36.

Figure 28:
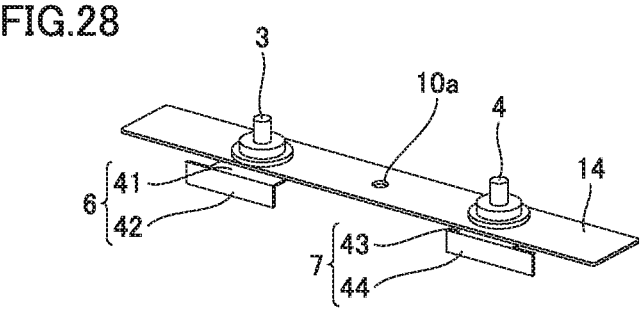
FIG. 28 is a perspective view showing a lid forming step S3.

FIG. 28 is a perspective view showing lid forming step S3. In lid forming step S3, positive electrode external terminal 3, negative electrode external terminal 4, positive electrode collector terminal 6, and negative electrode collector terminal 7 are integrally attached to lid 14. An injection port 10a is formed in lid 14.

Figure 29:
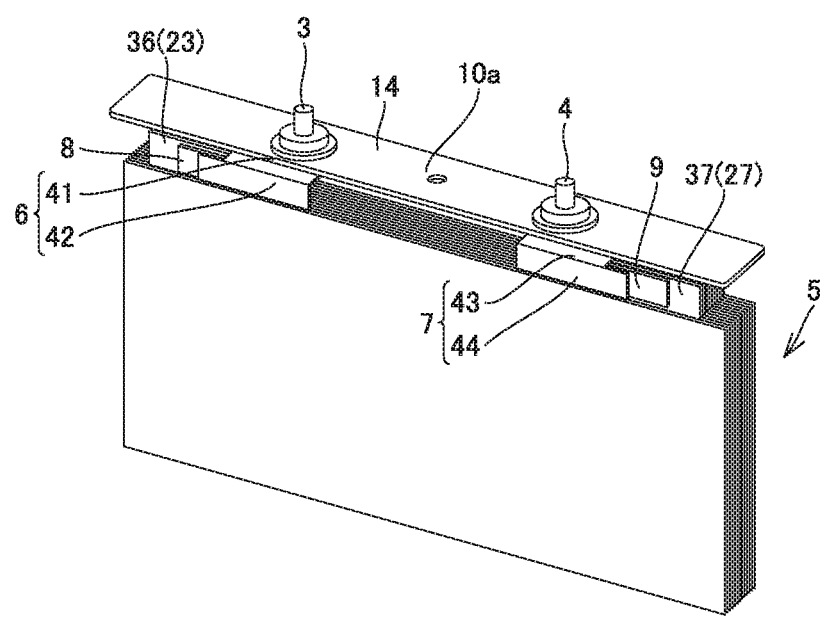
FIG. 29 is a perspective view showing an assembling step S4.

FIG. 29 is a perspective view showing assembling step S4. In assembling step S4, electrode assembly 5 is assembled to lid 14. Specifically, positive electrode collector terminal 6 is welded to conductive plate 8 provided in electrode assembly 5. Negative electrode collector terminal 7 is welded to conductive plate 9 provided in electrode assembly 5. As a result, lid 14 and electrode assembly 5 are integrally assembled.

Figure 30:
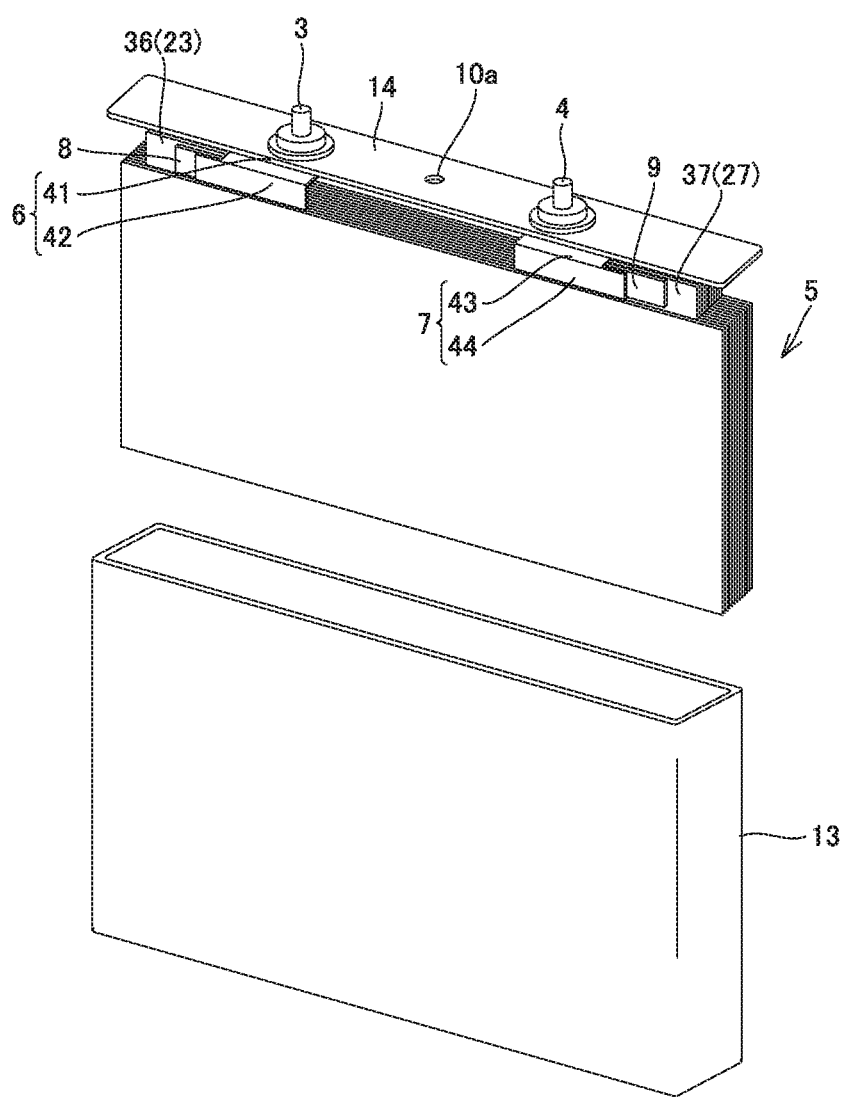
FIG. 30 is a perspective view showing a housing step S5.

FIG. 30 is a perspective view showing housing step S5. Housing step S5 includes the step of housing electrode assembly 5 in case main body 13 and the step of welding lid 14 to the opening edge portion of case main body 13. As a result, electrode assembly 5 and the like are housed in housing case 2.

In electrolyte injecting step S6, electrolyte 11 is injected through injection port 10a. Then, in sealing step S7, sealing member 10 is provided in injection port 10a. Power storage device 1 shown in FIGS. 1 and 2 can thus be made.

Next, power storage device 1 according to the first embodiment and a power storage device 1A according to a comparative example will be compared and the advantage of power storage device 1 according to the first embodiment will be described.

Figure 31:
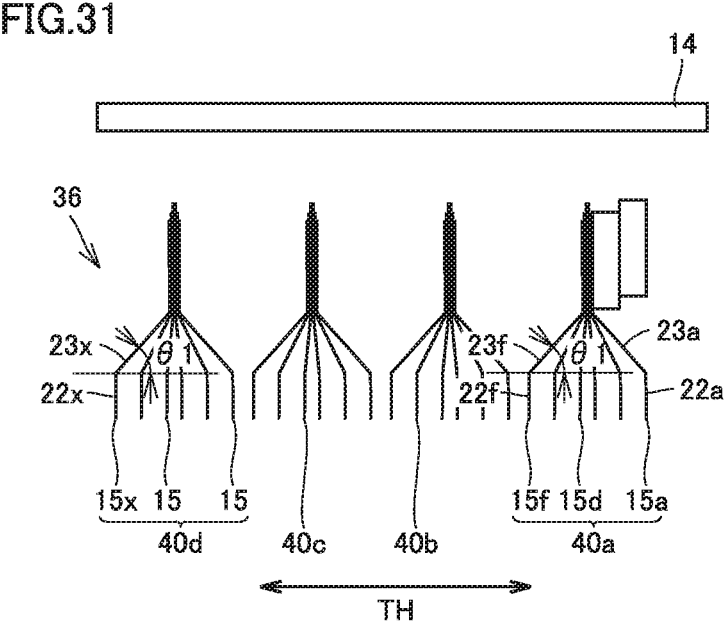
FIG. 31 is a cross-sectional view showing a configuration of positive electrode 36 and the surroundings thereof in power storage device 1 according to the present embodiment.

FIG. 31 is a cross-sectional view showing a configuration of positive electrode 36 and the surroundings thereof in power storage device 1 according to the first embodiment.

Positive electrode 36 includes the plurality of bundles 40a to 40d arranged in stacking direction TH. Bundle 40a includes a positive electrode sheet 15a, a positive electrode sheet 15d and a positive electrode sheet 15f.

Figure 32:
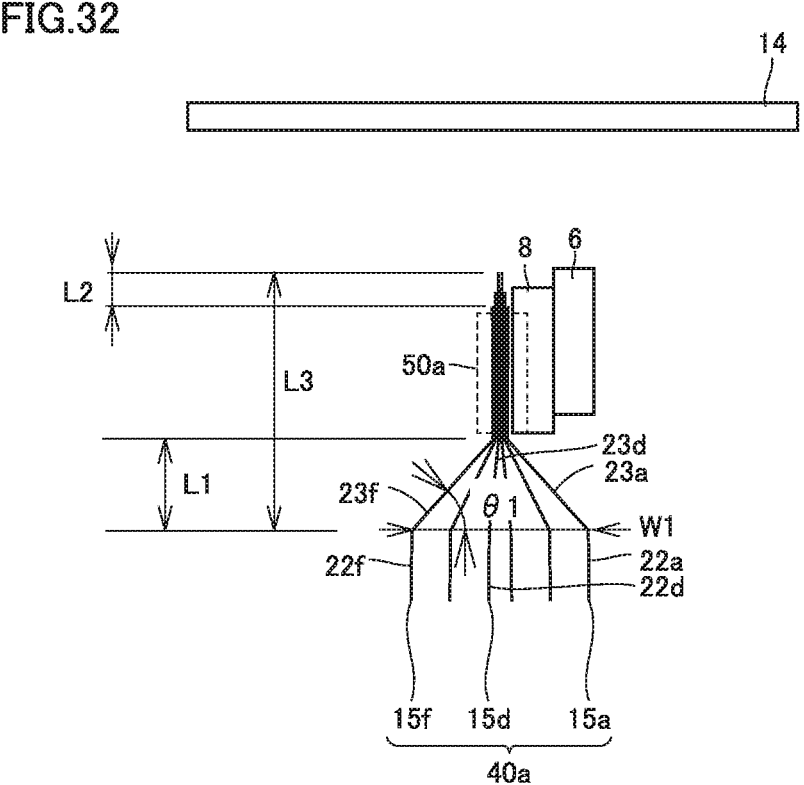
FIG. 32 is a cross-sectional view schematically showing a configuration of a bundle 40a and the surroundings thereof.

FIG. 32 is a cross-sectional view schematically showing a configuration of bundle 40a and the surroundings thereof. Positive electrode sheet 15a is located on the end side of bundle 40a in stacking direction TH. Positive electrode sheet 15a includes a foil main body 22a and a positive electrode tab 23a.

Positive electrode sheet 15d is located at the center of bundle 40a in stacking direction TH. Positive electrode sheet 15d includes a foil main body 22d and a positive electrode tab 23d.

Positive electrode sheet 15f is located on the end side of bundle 40a in stacking direction TH. Positive electrode sheet 15f includes a foil main body 22f and a positive electrode tab 23f. Positive electrode tabs 23a and 23f are formed so as to extend to be bent from upper edges of foil main bodies 22a and 22f, respectively. Positive electrode tabs 23a and 23f are then bent to extend along a side surface of conductive plate 8.

Positive electrode tab 23d is formed so as to extend in a substantially perpendicular direction from an upper edge of foil main body 22d.

Since positive electrode tabs 23a, 23d and 23f have the same length, an upper end of positive electrode tab 23d is located above upper ends of positive electrode tabs 23a and 23f.

Herein, an angle $\theta 1$ represents an angle formed by the upper edge of foil main body 22f and positive electrode tab 23f, and a width W1 represents a width of bundle 40a. In addition, in the upward/downward direction, a distance L1 represents a distance between the lower end of conductive plate 8 and the upper ends of foil main bodies 22a, 22d and 22f, and a distance L2 represents a distance between the upper end of positive electrode tab 23d and the upper ends of positive electrode tabs 23a and 23f. In the upward/downward direction, a distance L3 represents a distance between the upper end of positive electrode tab 23a and the upper end of foil main body 22a.

When angle $\theta 1$ is smaller than a prescribed angle, a crack or the like is likely to occur in a boundary portion between foil main body 22f and positive electrode tab 23f. Therefore, angle $\theta 1$ is set to be not less than the prescribed angle.

Distance L1 between the upper edge of foil main body 22 and the lower end of conductive plate 8 in the upward/downward direction is determined by angle $\theta 1$ and width W1.

Since positive electrode tabs 23a, 23d and 23f have the same length, distance L2 is determined by angle $\theta 1$ and width W1.

In bundle 40a, the number of positive electrode sheets 15 forming bundle 40a is small, and thus, width W1 is small and an increase in distance L2 is suppressed.

Since distance L1 and distance L2 are reduced to be short as described above, distance L3 can be reduced to be short.

Figure 33:
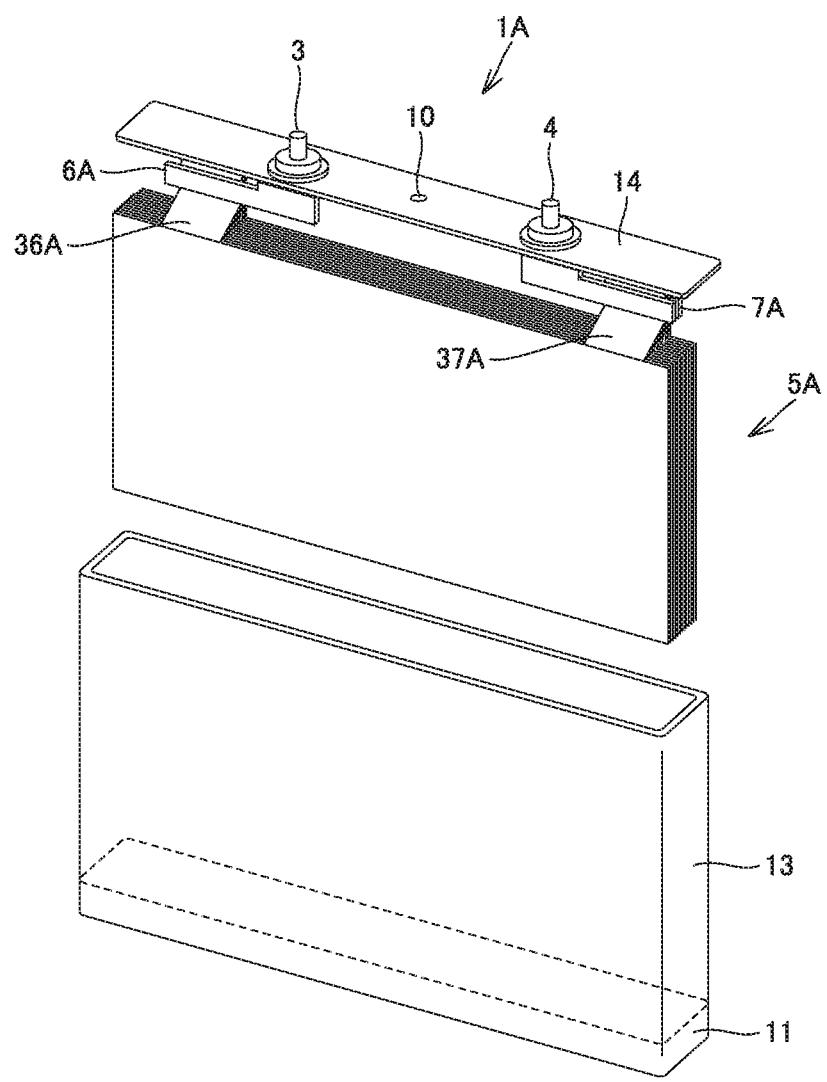
FIG. 33 is an exploded perspective view showing a power storage device 1A.

FIG. 33 is an exploded perspective view showing power storage device 1A. Power storage device 1A includes an electrode assembly 5A, a positive electrode collector terminal 6A and a negative electrode collector terminal 7B. Electrode assembly 5A includes a positive electrode 36A and a negative electrode 37B.

Positive electrode 36A is welded to positive electrode collector terminal 6A and negative electrode 37A is welded to negative electrode collector terminal 7A.

Figure 34:
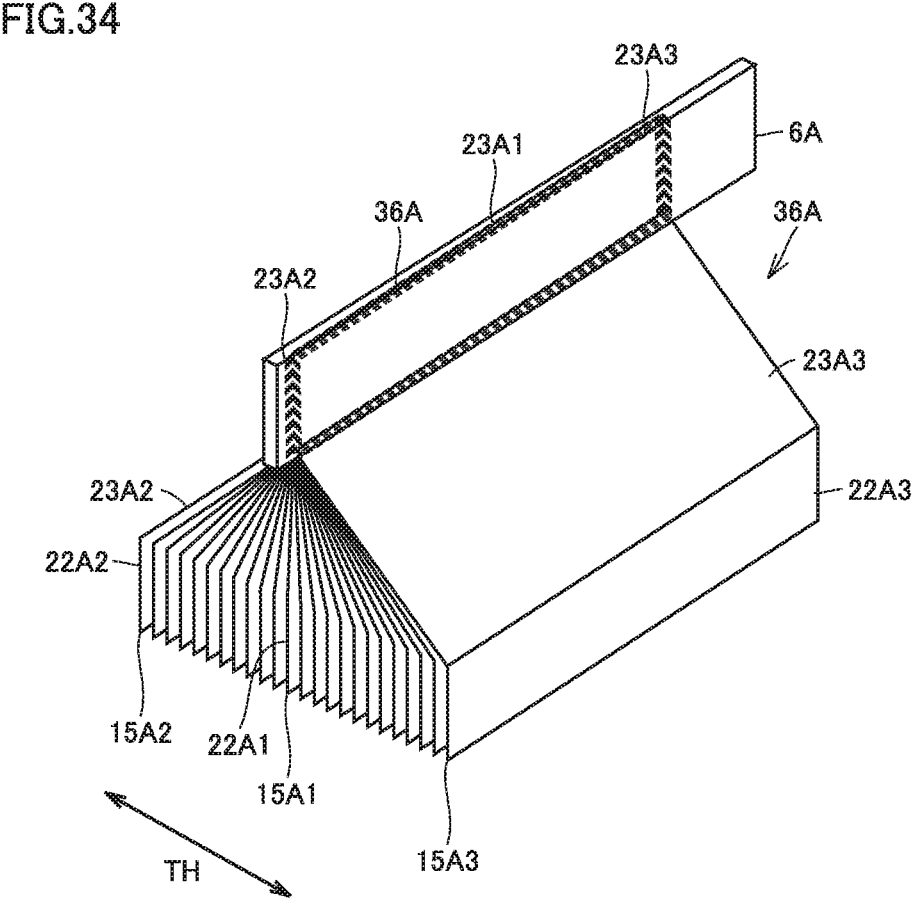
FIG. 34 is a perspective view schematically showing a positive electrode 36A and a positive electrode collector terminal 6A.
Figure 35:
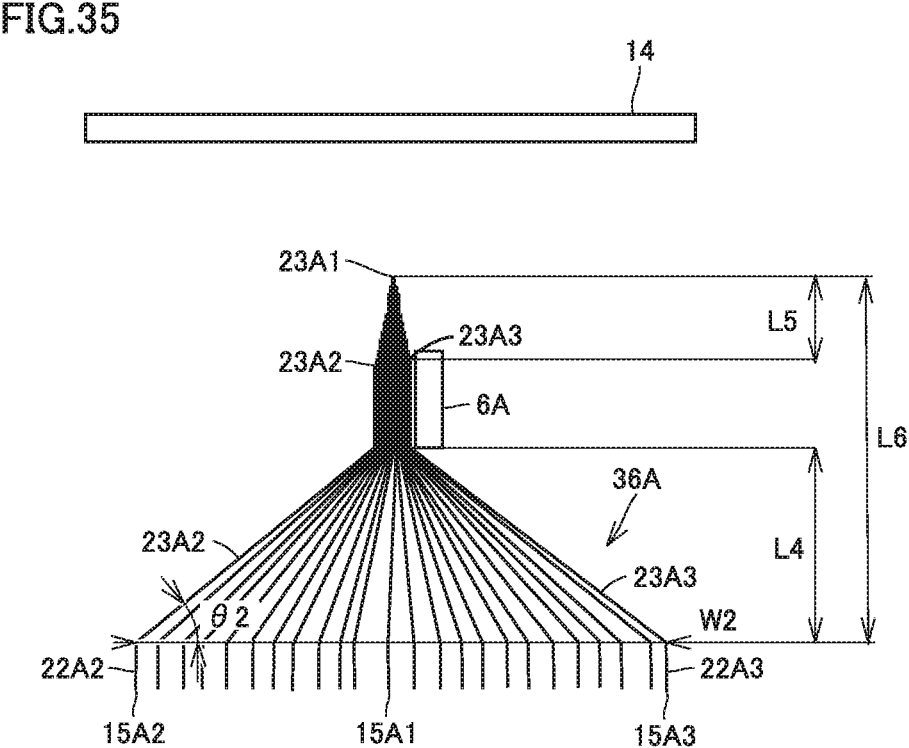
FIG. 35 is a cross-sectional view showing a configuration of positive electrode collector terminal 6A and positive electrode 36A as well as the surroundings thereof.

FIG. 34 is a perspective view schematically showing positive electrode 36A and positive electrode collector terminal 6A. FIG. 35 is a cross-sectional view showing a configuration of positive electrode collector terminal 6A and positive electrode 36A as well as the surroundings thereof.

All of positive electrode tabs 23A are collectively welded to positive electrode collector terminal 6A. Electrode assembly 5A includes a positive electrode sheet 15A1, a positive electrode sheet 15A2 and a positive electrode sheet 15A3. Positive electrode sheet 15A1 is located at the center of electrode assembly 5A in stacking direction TH. Positive electrode sheet 15A2 is located on the end side in stacking direction TH, and positive electrode sheet 15A3 is also located on the end side in stacking direction TH.

Positive electrode sheet 15A1 includes a foil main body 22A1 and a positive electrode tab 23A1. Positive electrode sheet 15A2 includes a foil main body 22A2 and a positive electrode tab 23A2, and positive electrode sheet 15A3 includes a foil main body 22A3 and a positive electrode tab 23A3.

Positive electrode tab 23A1 extends in the substantially perpendicular direction from an upper edge of foil main body 22A1 and is welded to positive electrode collector terminal 6A.

Positive electrode tabs 23A2 and 23A3 are formed so as to be bent on upper edges of foil main bodies 22A2 and 22A3 and extend toward positive electrode collector terminal 6A. Positive electrode tabs 23A2 and 23A3 are then bent to extend along a side surface of positive electrode collector terminal 6A.

Therefore, an upper end of positive electrode tab 23A1 is located significantly above upper ends of positive electrode tabs 23A2 and 23A3.

Herein, an angle $\theta 2$ represents an angle formed by the upper edge of positive electrode tab 23A2 and foil main body 22A2, and a width W2 represents a width of positive electrode 36A. In addition, in the upward/downward direction, a distance L4 represents a distance between the lower end of positive electrode collector terminal 6A and the upper end of foil main body 22A, and a distance L5 represents a distance between the upper end of positive electrode tab 23A1 and the upper ends of positive electrode tabs 23A2 and 23A3. A distance L6 represents a distance between the upper end of positive electrode tab 23A1 and the upper edge of foil main body 22A.

When angle $\theta 2$ is smaller than a prescribed angle, a crack or the like may occur in a boundary portion between the upper edge of foil main body 22A2 and positive electrode tab 23A2. Therefore, angle $\theta 2$ is also set to be not less than the prescribed angle.

Referring to FIGS. 32 and 35, positive electrode 36A is formed by bundling many positive electrode tabs 23A, and thus, a length of width W2 is longer than a length of width W1.

Since distance L4 is determined by angle θ2 and width W2, distance L4 is longer than distance L1.

In addition, since distance L5 is determined by angle θ2 and width W2, distance L5 is longer than distance L2. As a result, distance L6 in positive electrode 36A is longer than distance L3.

Therefore, a length of each positive electrode tab 23A in power storage device 1A according to the comparative example is longer than a length of each positive electrode tab 23 in power storage device 1 according to the first embodiment.

Figure 36:
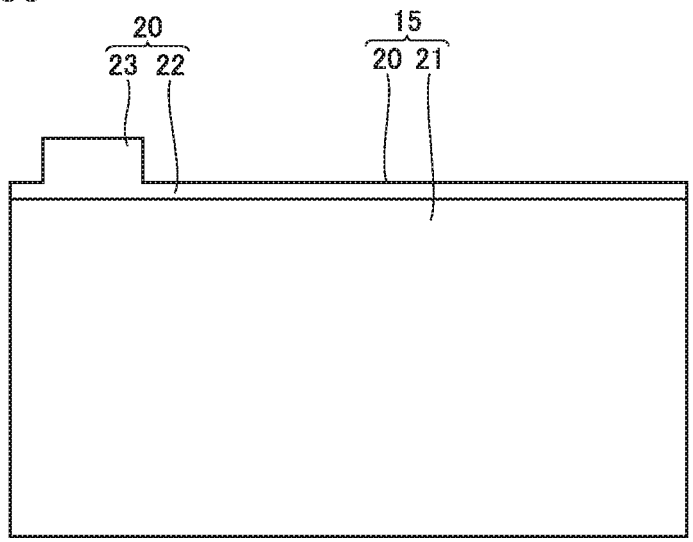
FIG. 36 is a plan view showing a positive electrode sheet 15 provided in power storage device 1 according to the present embodiment.
Figure 37:
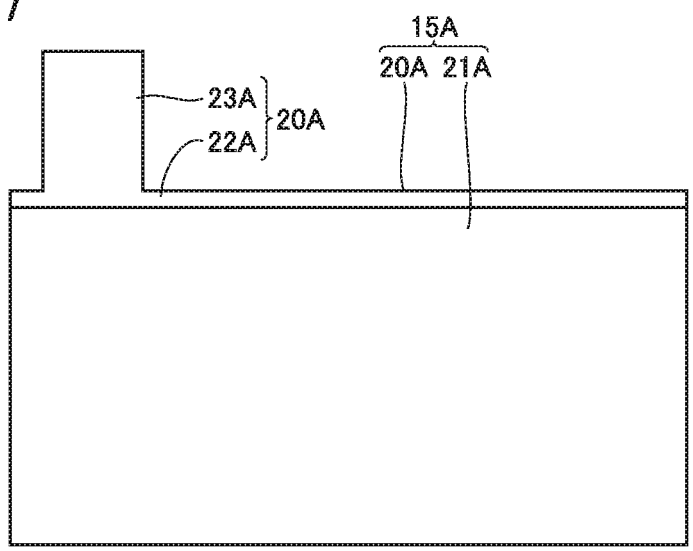
FIG. 37 is a plan view showing a positive electrode sheet 15A provided in power storage device 1A.

FIG. 36 is a plan view showing positive electrode sheet 15 provided in power storage device 1 according to the first embodiment, and FIG. 37 is a plan view showing positive electrode sheet 15A provided in power storage device 1A.

Referring to FIGS. 36 and 37, the length of positive electrode tab 23 of positive electrode sheet 15 is shorter than the length of positive electrode tab 23A of positive electrode sheet 15A. Assuming that an area of foil main body 22 of positive electrode sheet 15 is equal to an area of foil main body 22A of positive electrode sheet 15A, an area of metal foil 20 is smaller than an area of metal foil 20A.

Assuming that an area of a portion of positive electrode sheet 15 to which positive electrode composite material layer 21 is applied is equal to an area of a portion of positive electrode sheet 15A to which positive electrode composite material layer 21A is applied, a ratio of occupancy of positive electrode composite material layer 21 in positive electrode sheet 15 is higher than a ratio of occupancy of positive electrode composite material layer 21A in positive electrode sheet 15A.

Similarly, a ratio of occupancy of negative electrode composite material layer 25 in negative electrode sheet 17 of power storage device 1 is higher than a ratio of occupancy of a negative electrode composite material layer in a negative electrode sheet of power storage device 1A.

As a result, assuming that a ratio of occupancy of positive electrode composite material layer 21 in housing case 2 is an electrode assembly volume ratio (100×(volume of positive electrode composite material layer 21+volume of negative electrode composite material layer 25)/(internal volume of housing case 2)), the electrode assembly volume ratio of power storage device 1 is higher than the electrode assembly volume ratio of power storage device 1A.

Next, the function and effect in the process of manufacturing power storage device 1 will be described.

Referring to FIG. 6, in width direction W, welded portion 50a is formed at one end of positive electrode tab 23a and welded portion 50b is formed at the other end.

A length of positive electrode tab 23a in width direction W is longer than a length of positive electrode tab 23a in protruding direction H. Therefore, a distance between welded portion 50a and welded portion 50b is long. In welding step S23, welded portion 50a is formed and then welded portion 50b is formed, for example. When welded portion 50a is formed, welded portion 50a and the surroundings thereof are melted. When the metal foil is melted, a portion of the metal foil located around the melted portion is pulled by the melted portion due to surface tension of the melted portion.

Therefore, when welded portion 50a is formed and then welded portion 50b is formed near welded portion 50a, a crack may occur in a portion of the metal foil located between welded portion 50a and welded portion 50b.

On the other hand, the distance between welded portion 50a and welded portion 50b is long in power storage device 1, and thus, the occurrence of the above-described problem can be suppressed.

Particularly, in the first embodiment, the length of positive electrode tab 23 in width direction W is twice or more as long as the length of positive electrode tab 23 in protruding direction H. Therefore, the occurrence of a crack or the like in positive electrode tab 23 can be excellently suppressed.

Each of welded portions 50a, 50c, 50e, and 50g is formed at corner 52 of each positive electrode tab 23. Since a distance between corner 52 of each positive electrode tab 23 and each foil main body 22 is long, arrival of the heat generated during formation of each of welded portions 50a, 50c, 50e, and 50g at each positive electrode composite material layer 21 can be suppressed.

Furthermore, since the distance between each corner 52 and each foil main body 22 is secured, the occurrence of a wrinkle or the like in each foil main body 22 can be suppressed even if the melted portion pulls the metal foil around the melted portion during formation of each of welded portions 50a, 50c, 50e, and 50g.

Positive electrode 36 in the above-described embodiment has the configuration shown in FIGS. 4 and 5 and the like. In the example shown in these FIGS. 4 and 5, the opposing ends of each positive electrode tab 23 in bundles 40c to 40f are welded to any one of bundles 40c to 40f.

However, it is not essential that the opposing ends of each positive electrode tab 23 in bundles 40c to 40f are welded to any one of bundles 40c to 40f.

Figure 38:
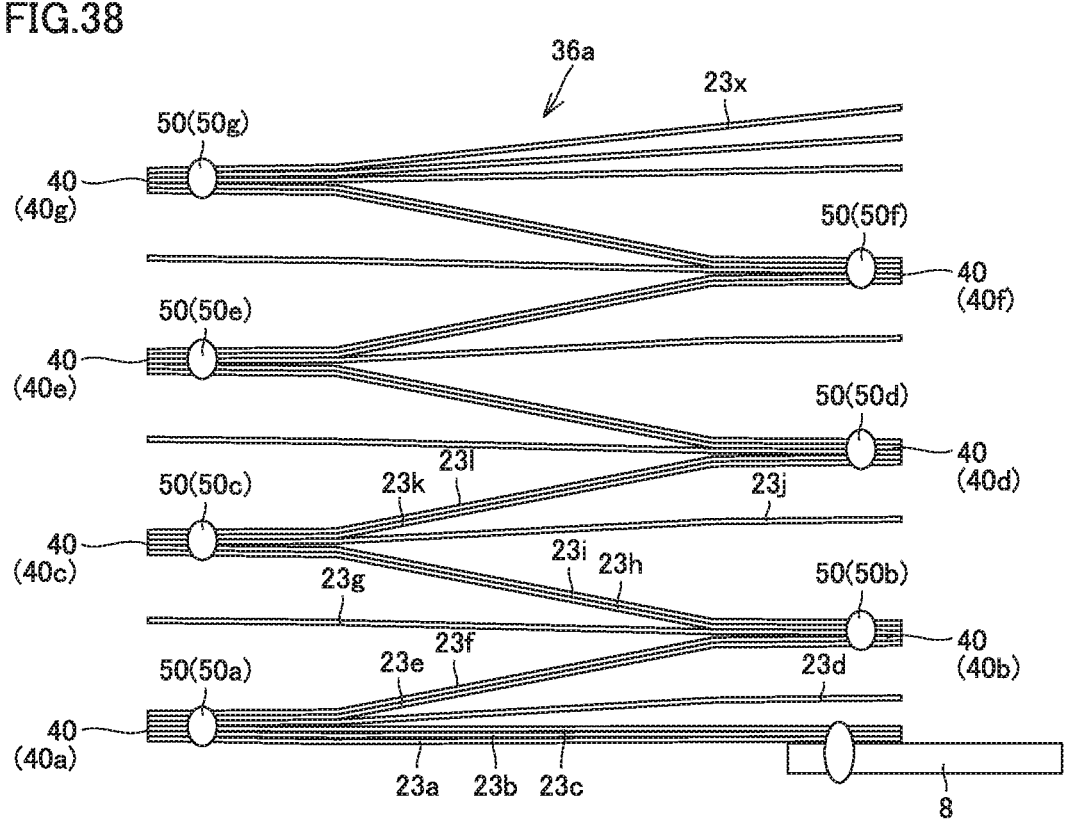
FIG. 38 is a plan view showing a positive electrode 36a which is a first modification of positive electrode 36.

FIG. 38 is a plan view showing a positive electrode 36a which is a first modification of positive electrode 36. Positive electrode 36a is provided with positive electrode tab 23 whose one end is only welded to welded portion 50, like positive electrode tabs 23d and 23g.

According to this configuration of positive electrode 36a, the number of positive electrode tabs 23 bundled by one welded portion 50 can be reduced. Thus, an amount of heat generated during formation of welded portion 50 can be reduced and an influence on the positive electrode composite material layer and the like can be reduced.

In positive electrode 36a, one positive electrode tab 23 per one welded portion 50 is welded to welded portion 50 at only one end.

Figure 39:
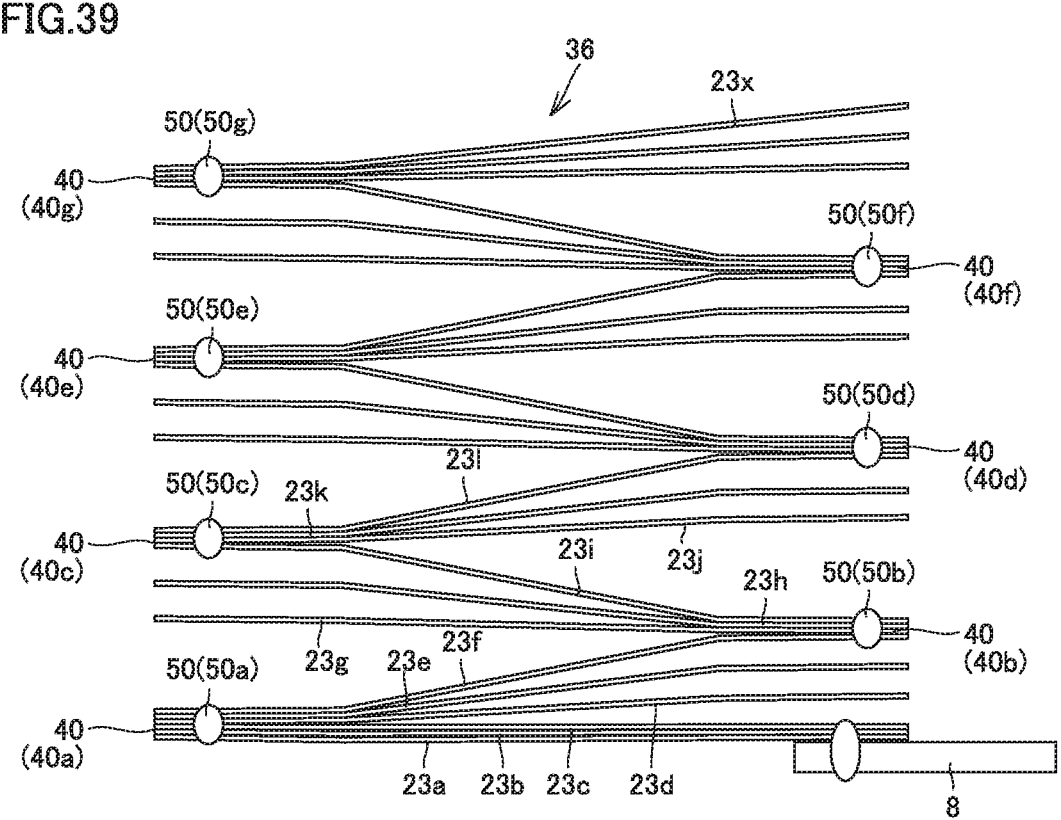
FIG. 39 is a plan view showing a positive electrode 36b which is a second modification of positive electrode 36.

FIG. 39 is a plan view showing a positive electrode 36b which is a second modification of positive electrode 36. In this positive electrode 36b, two positive electrode tabs 23 per one welded portion 50 are welded to welded portion 50 at only one end.

In the example shown in FIGS. 5, 38 and 39 above, description has been given of the example in which welded portions 50 are formed at the opposing ends of positive electrode 36. However, welded portion 50 may further be formed between welded portions 50 formed at the opposing ends.

Second Embodiment

A power storage device 1B according to a second embodiment will be described with reference to FIGS. 40 and 41. Configurations of a positive electrode 136 and a negative electrode of power storage device 1B are different from the configurations of positive electrode 36 and negative electrode 37 of power storage device 1 according to the above-described embodiment. Since the configuration of positive electrode 136 and the configuration of the negative electrode are substantially the same in power storage device 1B, the configuration of positive electrode 136 will be described.

Figure 40:
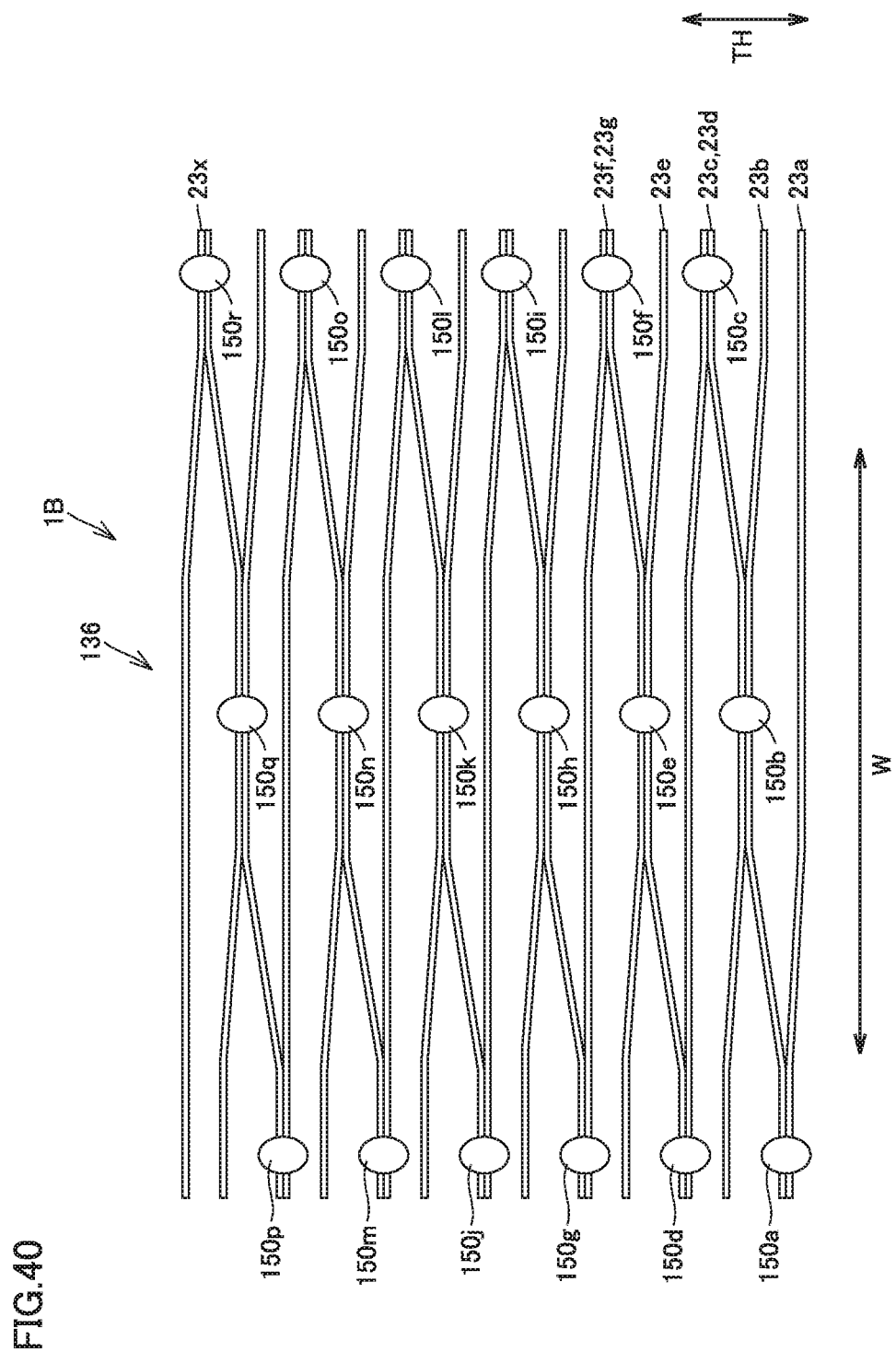
FIG. 40 is a plan view showing a configuration of positive electrode 36 of a power storage device 1B.
Figure 41:
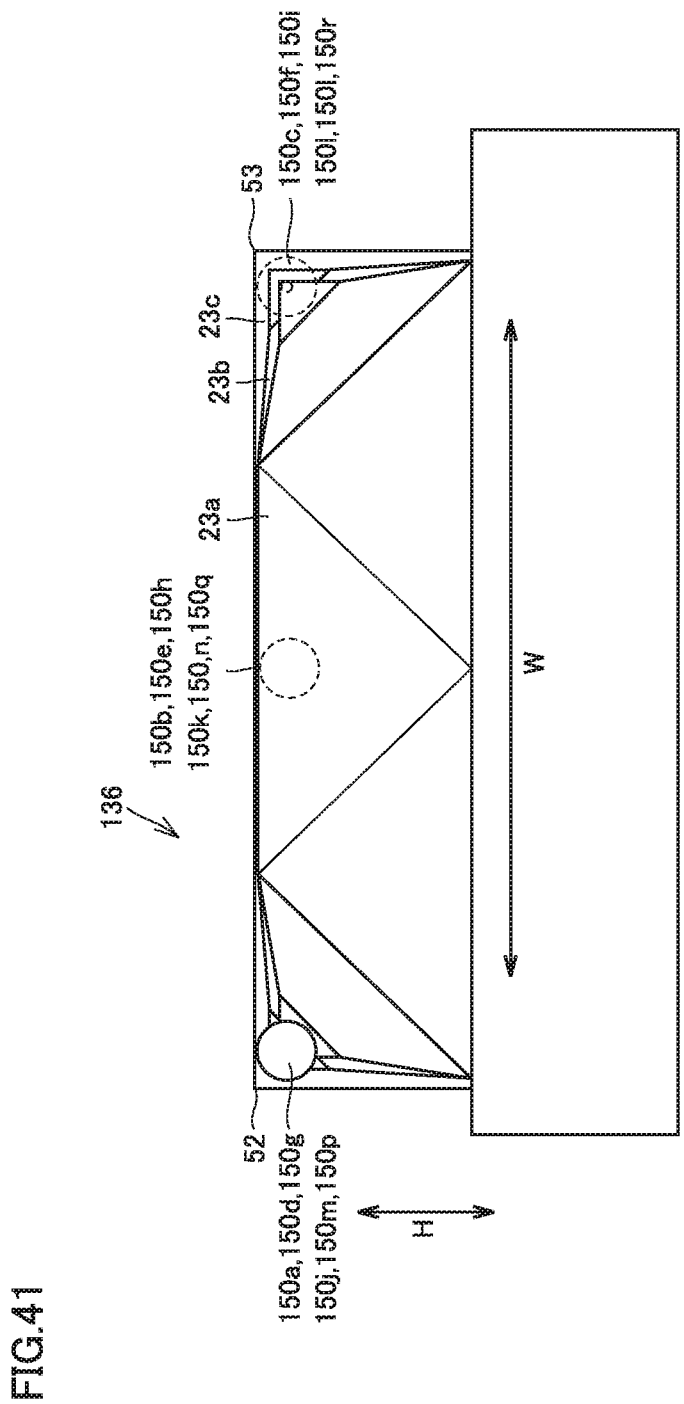
FIG. 41 is a front view of positive electrode 36 when viewed from a stacking direction TH.

FIG. 40 is a plan view showing the configuration of positive electrode 136 of power storage device 1B, and FIG. 41 is a front view of positive electrode 136 when viewed from stacking direction TH.

Positive electrode 136 includes welded portions 150a, 150d, 150g, 150j, 150m, and 150p formed on one end side of positive electrode 136 in width direction W, welded portions 150c, 150f, 150i, 150l, 150o, and 150r formed on the other end side of positive electrode 136 in width direction W, and welded portions 150b, 150e, 150h, 150k, 150n, and 150q formed at the center of positive electrode 136 in width direction W.

Welded portions 150a, 150d, 150g, 150j, 150m, and 150p are arranged in stacking direction TH. Welded portions 150c, 150f, 150i, 150l, 150o, and 150r are also arranged in stacking direction TH. Welded portions 150b, 150e, 150h, 150k, 150n, and 150q are also arranged in stacking direction TH.

As described above, when positive electrode 136 is viewed from stacking direction TH, welded portions (third joined portions) 150b, 150e, 150h, 150k, 150n, and 150q are disposed between welded portions (first joined portions) 150a, 150d, 150g, 150j, 150m, and 150p and welded portions (second joined portions) 150c, 150f, 150i, 150l, 150o, and 150r.

Since welded portions 150b, 150e, 150h, 150k, 150n, and 150q are also formed at the center of positive electrode 136 as described above, the number of positive electrode tabs 23 bundled by each of welded portions 150a to 150r can be reduced.

Thus, even when the length of each positive electrode tab 23 in protruding direction H is reduced, adjacent positive electrode tabs 23 can be welded and a height of positive electrode tab 23 can be reduced.

As a result, a height of positive electrode 136 can be reduced, a height of power storage device 1B can also be reduced, and a size of power storage device 1B can be reduced.

The length of each positive electrode tab 23 in width direction W is preferably four times or more as long as the length of each positive electrode tab 23 in protruding direction H.

A length of positive electrode tab 23 and negative electrode tab 27 in width direction W is shorter than a half of a length of foil main bodies 22 and 26 in width direction W. This is because when positive electrode tab 23 and negative electrode tab 27 overlap with each other in stacking direction TH, positive electrode tab 23 and negative electrode tab 27 may come into contact with each other and be short-circuited.

In the above-described embodiment, description has been given of the example in which "welded portions" are formed as a method for joining positive electrode tabs 23 and negative electrode tabs 27. However, various methods can be used as the joining method. For example, it is conceivable to join positive electrode tabs 23 by a sandwiching member. Laser welding and the like can also be used as a welding method.

Although the electrode assembly (power storage assembly) of the secondary battery has been described, the configuration of the present disclosure is also applicable to a power storage assembly such as, for example, a capacitor. For example, this capacitor includes a plurality of unit capacitors and each unit capacitor includes two electrode plates. Each electrode plate is provided with a tab. The configuration of the present disclosure is also applicable to such a capacitor.

Example

Comparison between power storage device 1 according to the present example and power storage device 1A according to the comparative example will be described. In FIGS. 4 and 5, in power storage device 1 according to the first embodiment, four positive electrode tabs 23 are welded in each welded portion 50. In negative electrode 37 as well, four negative electrode tabs 27 are similarly joined to one welded portion 50. Positive electrode 36A of power storage device 1A according to the comparative example has the configuration shown in FIGS. 34 and 35, and the negative electrode is formed similarly to positive electrode 36A.

The housing case of each of power storage device 1 and power storage device 1A is configured such that an internal dimension in the height direction is 85 mm, an internal dimension in the width direction is 140 mm, and an internal dimension in the stacking direction is 25 mm.

Table 1 below shows an electrode assembly volume ratio of power storage device 1A according to the comparative example and an electrode assembly volume ratio of power storage device 1 according to the present example. The electrode assembly volume ratio of power storage device 1 according to the present example is a value when the electrode assembly volume ratio of power storage device 1A according to the comparative example is regarded as 100%.

TABLE 1

| | Electrode Assembly Volume Ratio (Comparative Example is regarded as 100%) |
|---|---|
| Comparative Example | 100.0% |
| Present Example | 104.9% |

As is clear from Table 1 above, the electrode assembly volume ratio of power storage device 1 according to the present example is higher than the electrode assembly volume ratio of power storage device 1A according to the comparative example.

This may be because the length of positive electrode tab 23 can be made shorter in power storage device 1 than in power storage device 1A, and thus, the volume of the positive electrode composite material layer and the negative electrode composite material layer can be increased even when the internal volume of the housing case is the same. The volume of the stacked main body of the electrode assembly in the present example is increased by 4.9% with respect to the volume of the stacked main body of the electrode assembly according to the comparative example.

Although the present disclosure has been described and illustrated in detail, it is clearly understood that the same is by way of illustration and example only and is not to be taken by way of limitation, the scope of the present subject matter being interpreted by the terms of the appended claims.

What is claimed is:
1. A power storage device comprising:
   a power storage assembly including a plurality of electrode plates stacked in a stacking direction; and
   a plurality of joined portions formed in the power storage assembly, each of the plurality of electrode plates including an electrode plate main body and a tab formed so as to protrude from an outer peripheral edge portion of the electrode plate main body, the plurality of electrode plates being disposed such that the tabs are arranged in the stacking direction, the plurality of joined portions including a first joined portion configured to join the plurality of tabs arranged in the stacking direction to form a first bundle portion, and a second joined portion configured to join the plurality of tabs arranged in the stacking direction to form a second bundle portion, a part of the tabs in the first bundle portion and a part of the tabs in the second bundle portion being directly joined to the first joined portion and the second joined portion, when the first joined portion and the second joined portion are viewed from the stacking direction, the first joined portion and the second joined portion being formed so as to be spaced apart from each other, wherein the plurality of joined portions are portions of the plurality of tabs.

2. The power storage device according to claim 1, wherein the plurality of joined portions include a third joined portion configured to join the plurality of tabs arranged in the stacking direction to form a third bundle portion, and when the first joined portion, the second joined portion and the third joined portion are viewed from the stacking direction, the first joined portion, the second joined portion and the third joined portion are formed so as to be spaced apart from one another.

3. The power storage device according to claim 1, wherein assuming that a direction in which the tab protrudes from the electrode plate main body is a protruding direction and a direction in which the tab extends along the outer peripheral edge portion of the electrode plate main body is a width direction, a length of the tab in the width direction is longer than a length of the tab in the protruding direction.

4. The power storage device according to claim 3, wherein the first joined portion is formed on one end side of the tab in the width direction, and the second joined portion is formed on an other end side of the tab in the width direction.

* * * * *